United States Patent
Mitani et al.

(10) Patent No.: US 10,877,288 B2
(45) Date of Patent: Dec. 29, 2020

(54) IMAGING DEVICE AND IMAGING METHOD

(71) Applicant: Sony Corporation, Tokyo (JP)

(72) Inventors: Hitoshi Mitani, Kanagawa (JP); Masafumi Wakazono, Tokyo (JP)

(73) Assignee: Sony Corporation, Tokyo (JP)

( * ) Notice: Subject to any disclaimer, the term of this patent is extended or adjusted under 35 U.S.C. 154(b) by 43 days.

(21) Appl. No.: 16/302,385

(22) PCT Filed: Aug. 9, 2017

(86) PCT No.: PCT/JP2017/028917
§ 371 (c)(1),
(2) Date: Nov. 16, 2018

(87) PCT Pub. No.: WO2018/034210
PCT Pub. Date: Feb. 22, 2018

(65) Prior Publication Data
US 2019/0310487 A1 Oct. 10, 2019

(30) Foreign Application Priority Data

Aug. 18, 2016 (JP) .................................. 2016-160547

(51) Int. Cl.
*G02B 27/28* (2006.01)
*G02B 5/30* (2006.01)
*H04N 5/225* (2006.01)
*H04N 5/235* (2006.01)
*H04N 5/262* (2006.01)
*G01J 4/04* (2006.01)

(52) U.S. Cl.
CPC .............. *G02B 27/281* (2013.01); *G01J 4/04* (2013.01); *G02B 5/3016* (2013.01);
(Continued)

(58) Field of Classification Search
CPC .... G02B 5/3016; G02B 5/3025; G02B 27/28; G02B 27/281; G02B 27/286;
(Continued)

(56) References Cited

U.S. PATENT DOCUMENTS

| 5,347,378 A * | 9/1994 | Handschy ........... G02F 1/13473 349/102 |
| 7,369,172 B2 * | 5/2008 | Fujii ......................... B60R 1/00 348/118 |

(Continued)

FOREIGN PATENT DOCUMENTS

| JP | 2005-099662 A | 4/2005 |
| JP | 2006-084775 A | 3/2006 |

(Continued)

OTHER PUBLICATIONS

Japanese Office Action dated Feb. 4, 2020 for corresponding Japanese Application No. 2016-160547.

*Primary Examiner* — Lin Ye
*Assistant Examiner* — Chriss S Yoder, III
(74) *Attorney, Agent, or Firm* — Michael Best & Friedrich LLP

(57) ABSTRACT

There is provided an imaging device including: an imaging section configured to set pixels as polarization pixels having any of polarization directions, the pixels generating pixel signals on the basis of incident light; a polarization direction rotating section provided on an incidence plane side of the imaging section, and configured to rotate a polarization direction of the incident light; and a control section configured to control the imaging section and the polarization direction rotating section to generate a polarized image or a non-polarized image having higher resolution than resolution of the polarized image.

17 Claims, 15 Drawing Sheets

(52) U.S. Cl.
CPC ......... *G02B 27/286* (2013.01); *H04N 5/2254* (2013.01); *H04N 5/2356* (2013.01); *H04N 5/2621* (2013.01)

(58) Field of Classification Search
CPC .. G02B 27/288; H04N 5/2256; H04N 5/2254; H04N 5/2356; H04N 5/2621; G01J 4/04
See application file for complete search history.

(56) References Cited

U.S. PATENT DOCUMENTS

| | | | | |
|---|---|---|---|---|
| 7,688,363 B2 * | 3/2010 | Sato | ...................... | G06T 3/4053 348/240.2 |
| 7,760,256 B2 * | 7/2010 | Kanamori | .............. | H04N 9/045 348/222.1 |
| 8,184,194 B2 * | 5/2012 | Sato | ..................... | G02B 27/283 348/335 |

FOREIGN PATENT DOCUMENTS

| | | |
|---|---|---|
| JP | 2011-526105 A | 9/2011 |
| JP | 2011-237646 A | 11/2011 |
| JP | 2013-098928 A | 5/2013 |
| JP | 2015-114307 A | 6/2015 |
| JP | 2015-180864 A | 10/2015 |
| WO | 2007/139067 A1 | 12/2007 |
| WO | 2011/070708 A1 | 6/2011 |
| WO | 2012/017600 A1 | 2/2012 |
| WO | 2012/039086 A1 | 3/2012 |
| WO | 2006/059504 A1 | 6/2016 |

* cited by examiner

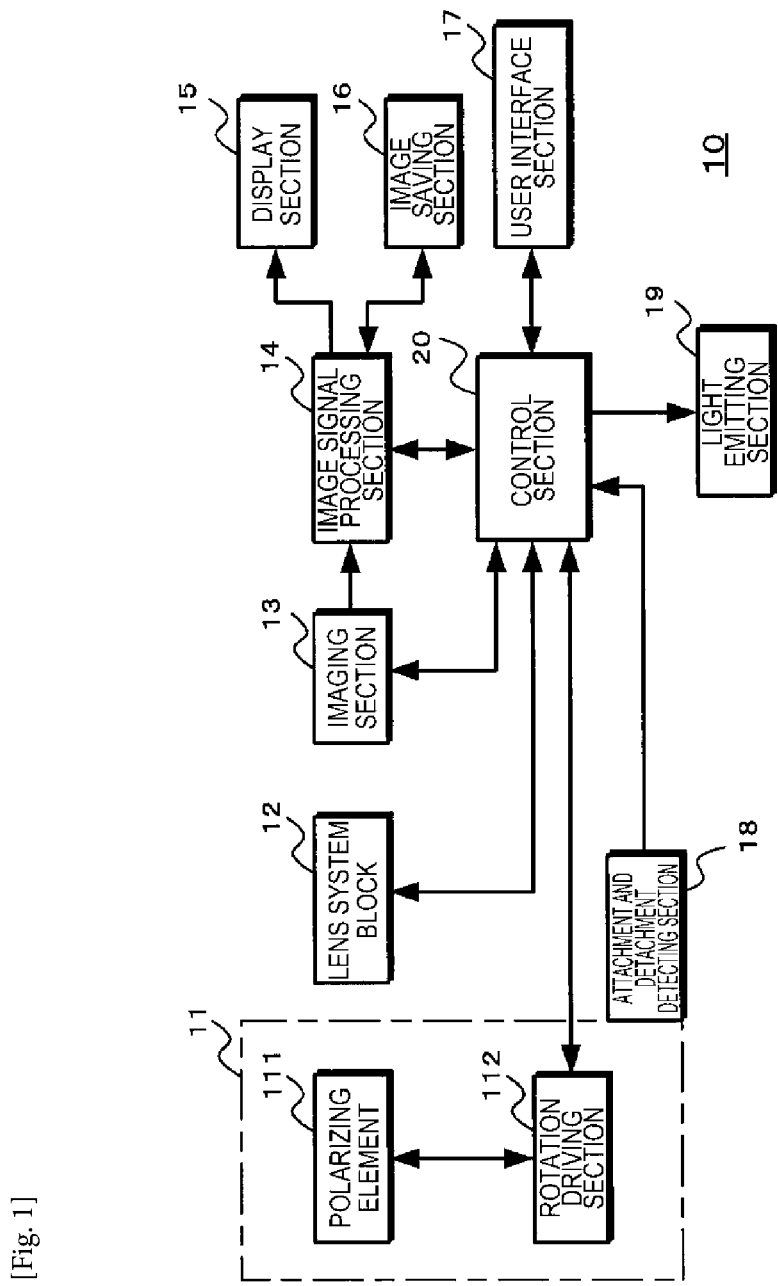
[Fig. 1]

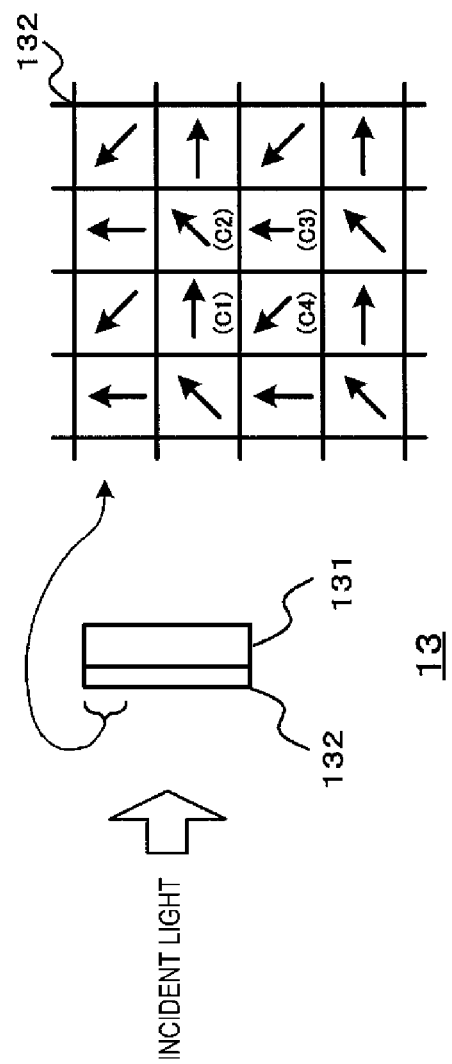

[Fig. 3]
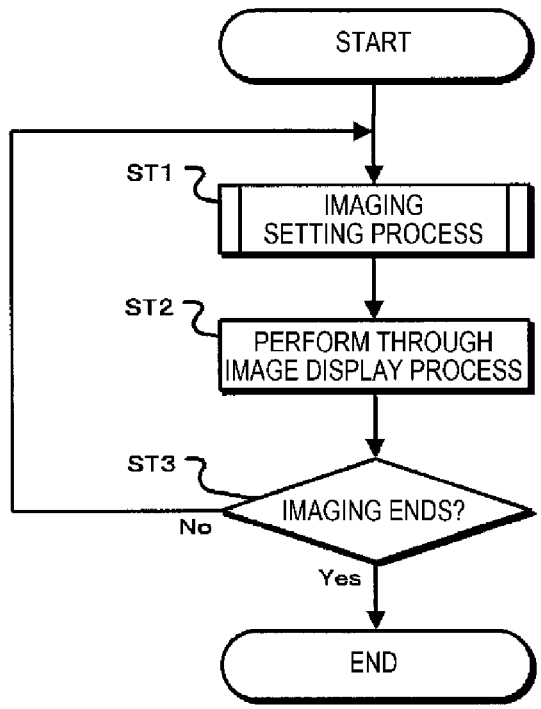
[Fig. 4]
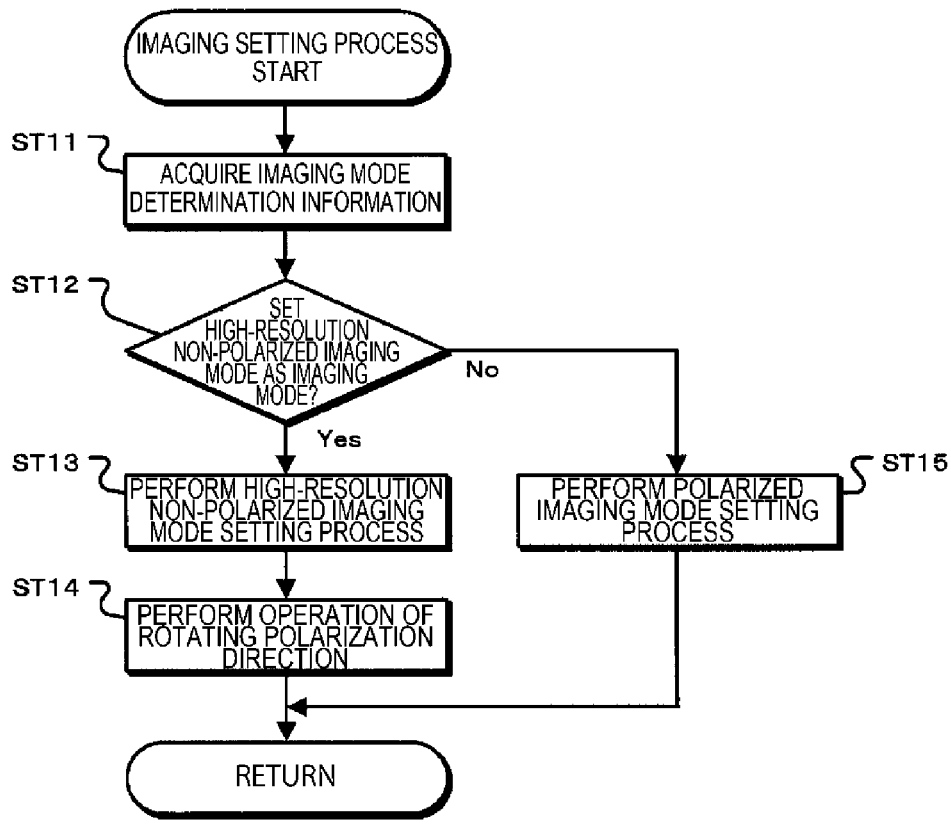

[Fig. 5]
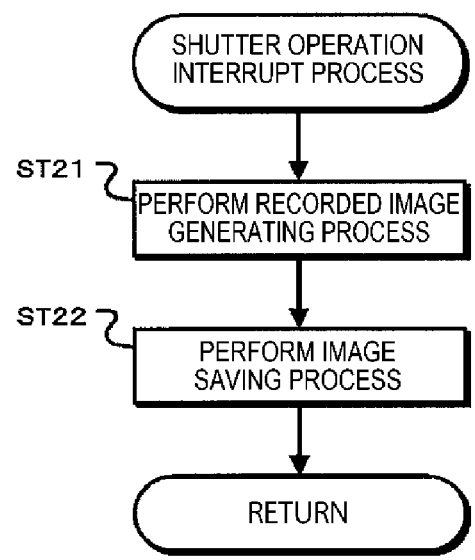

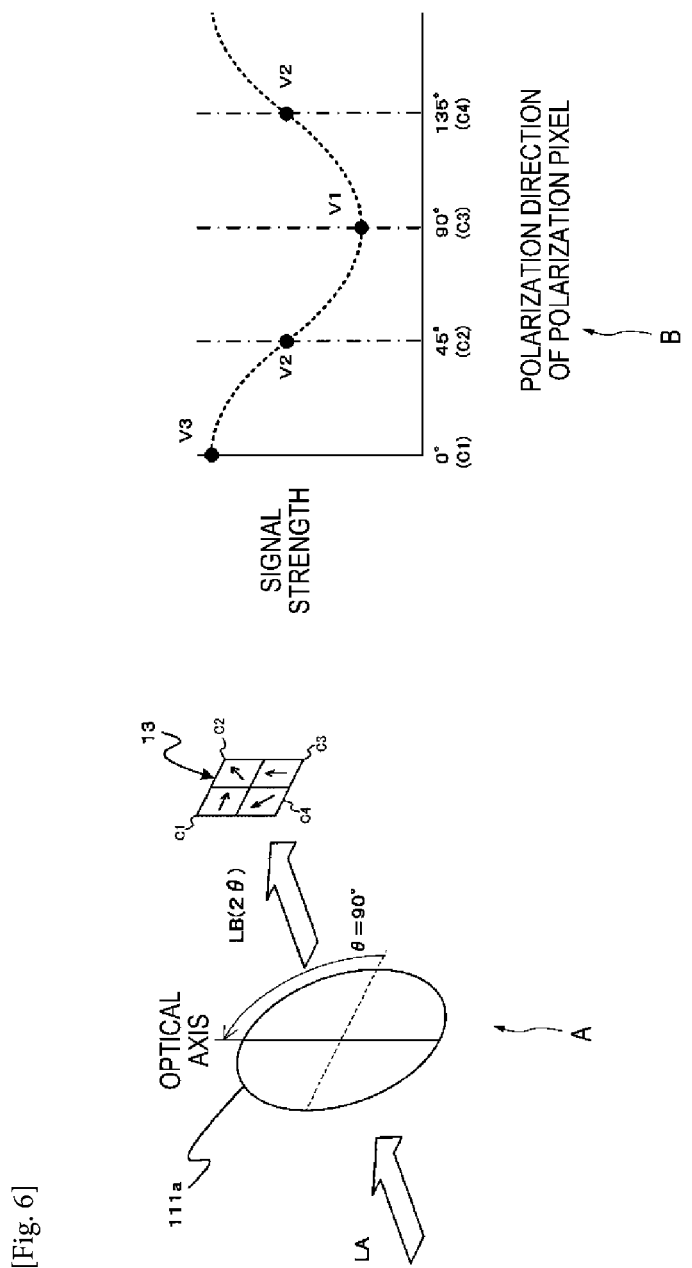
[Fig. 6]

[Fig. 7]
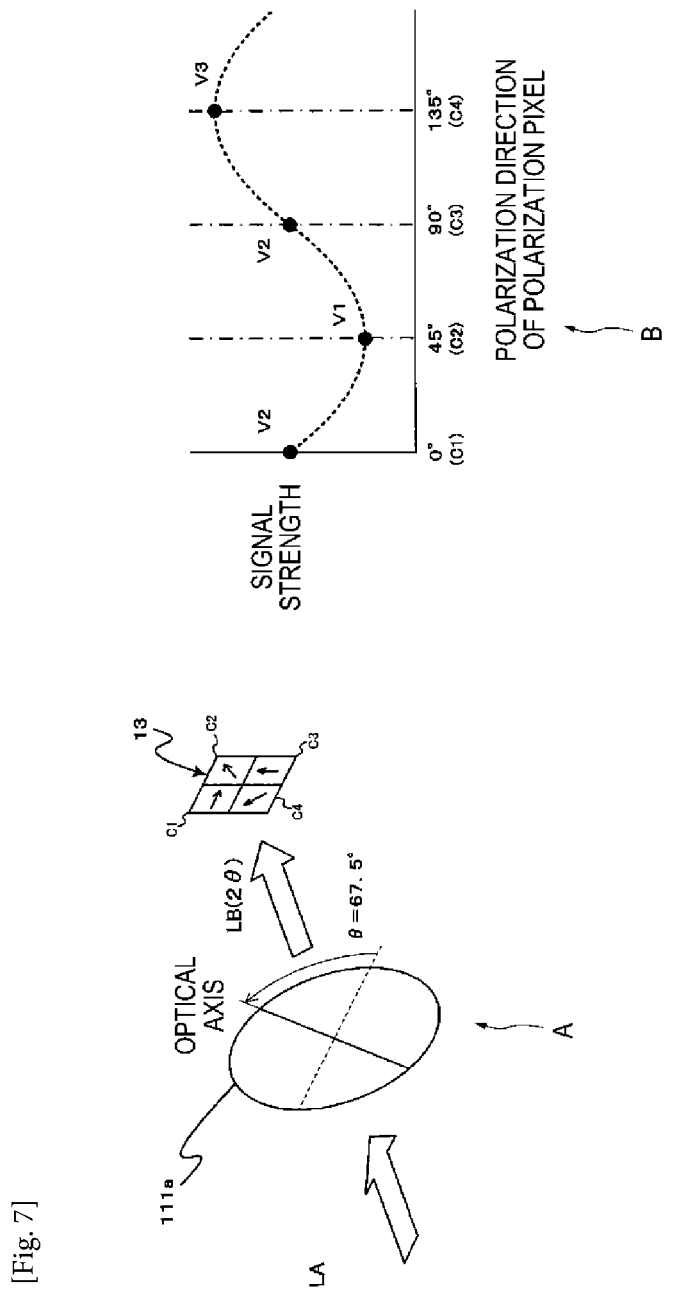

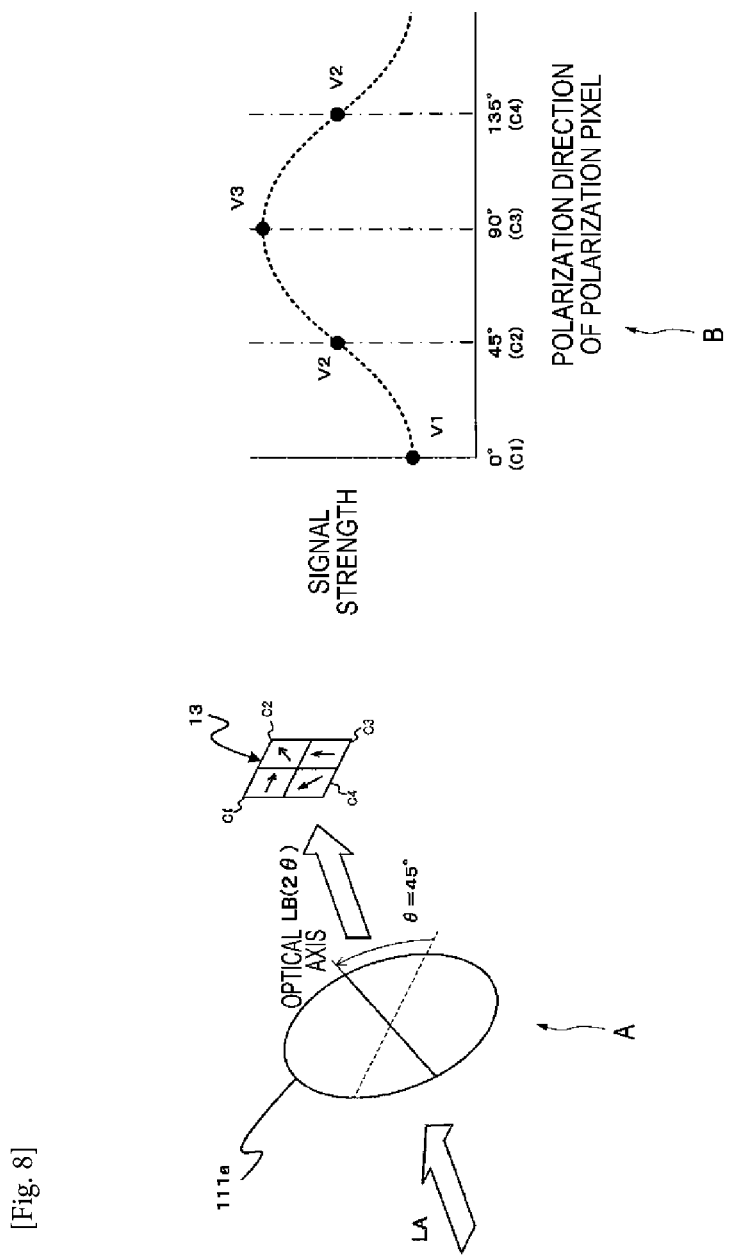

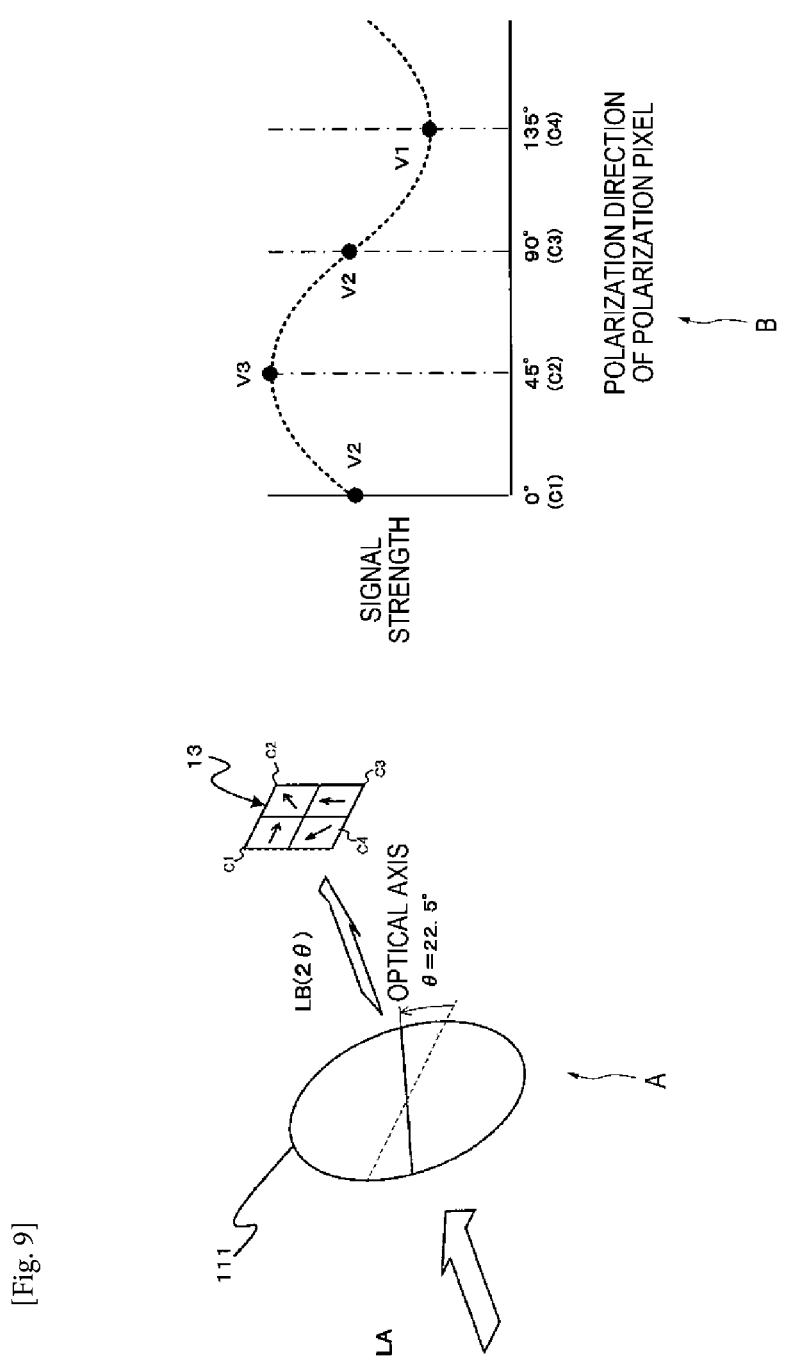

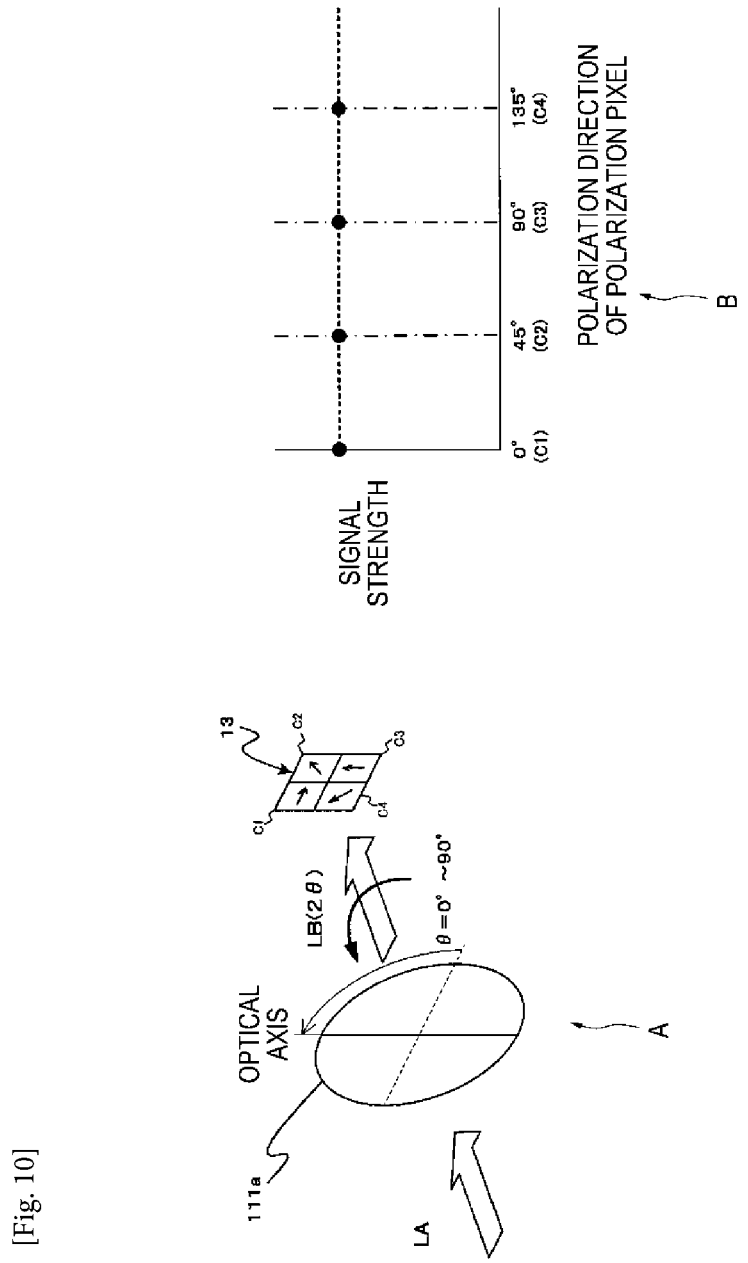

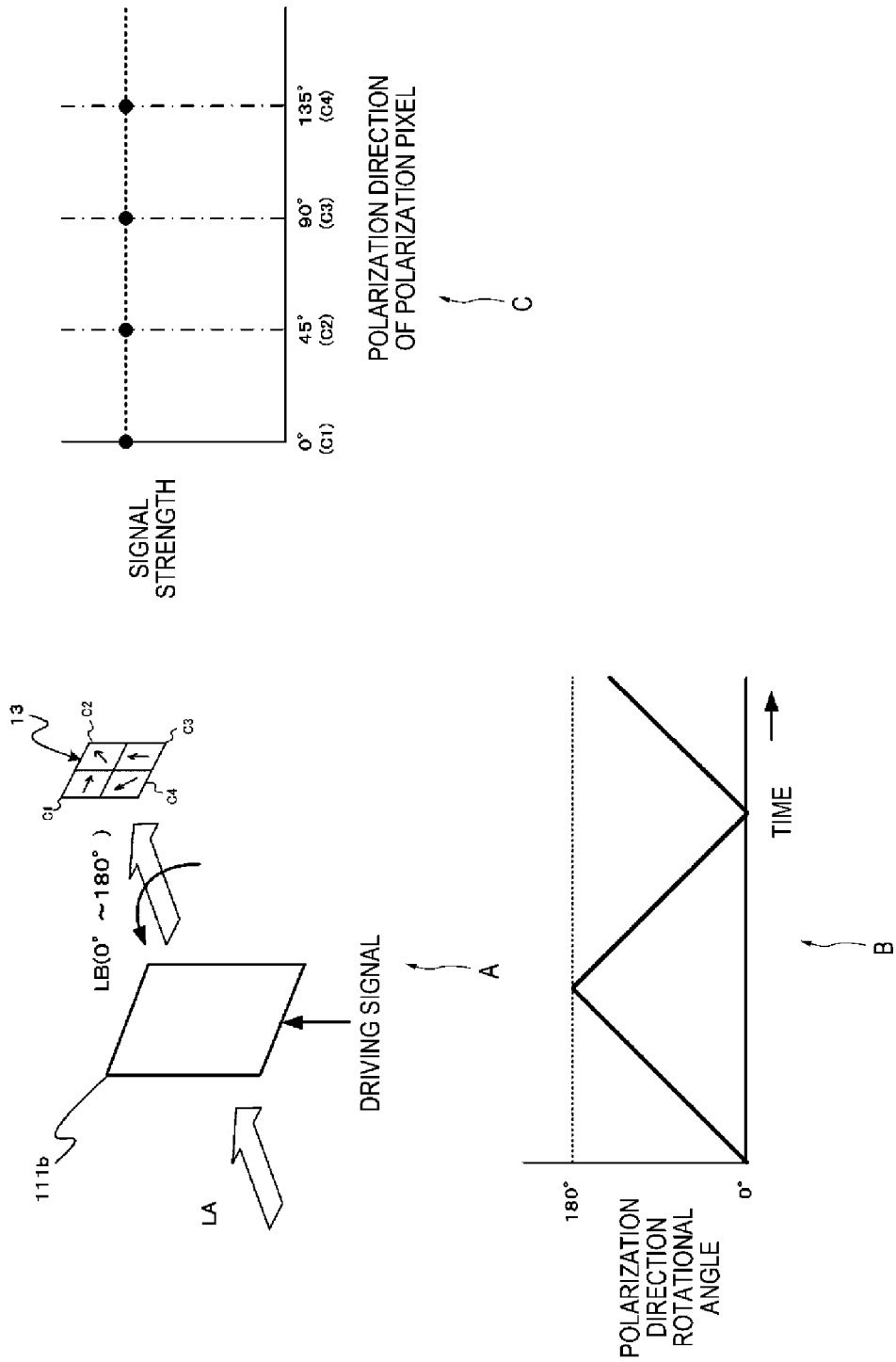

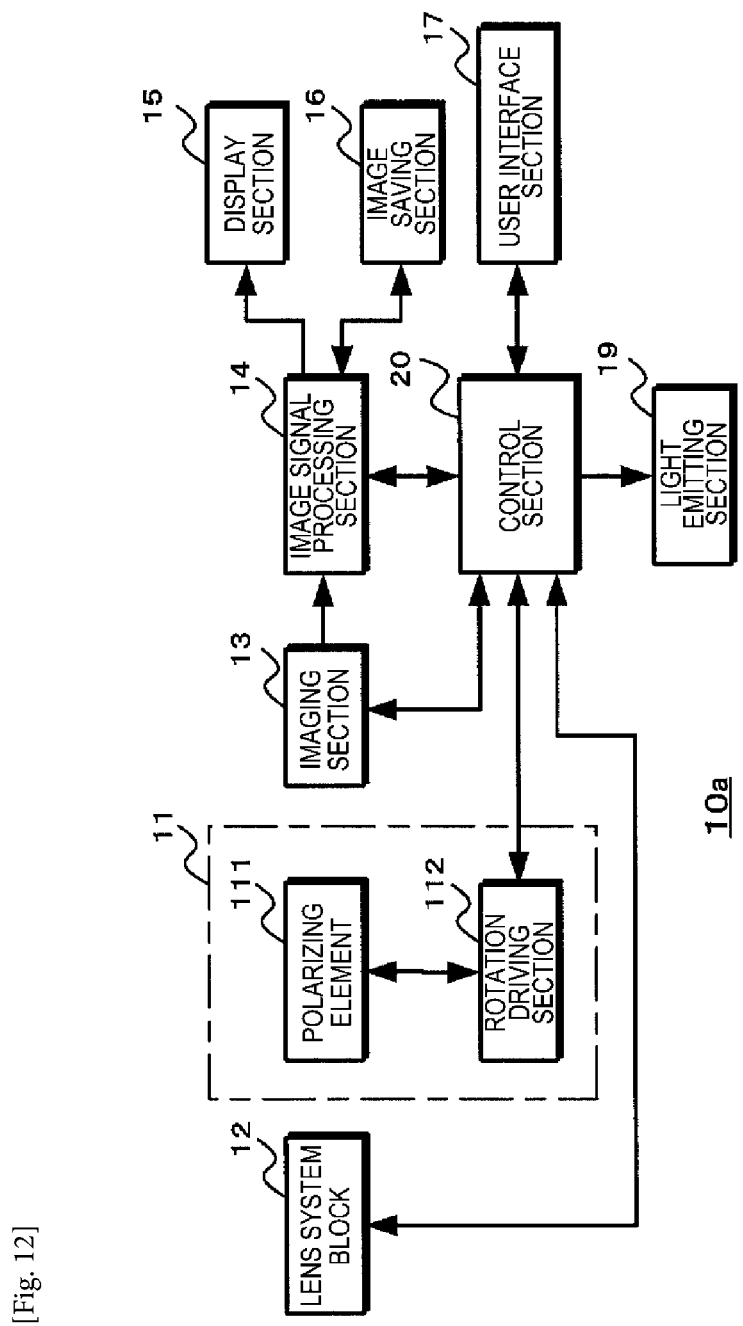
[Fig. 12]

[Fig. 13]

[Fig. 14]
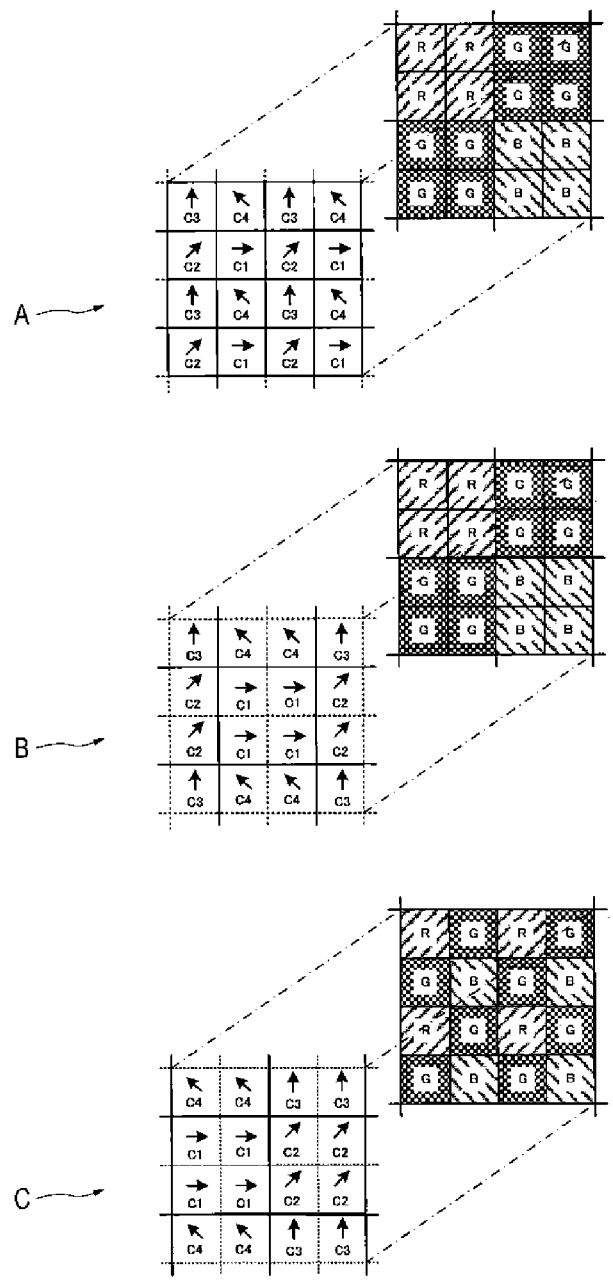

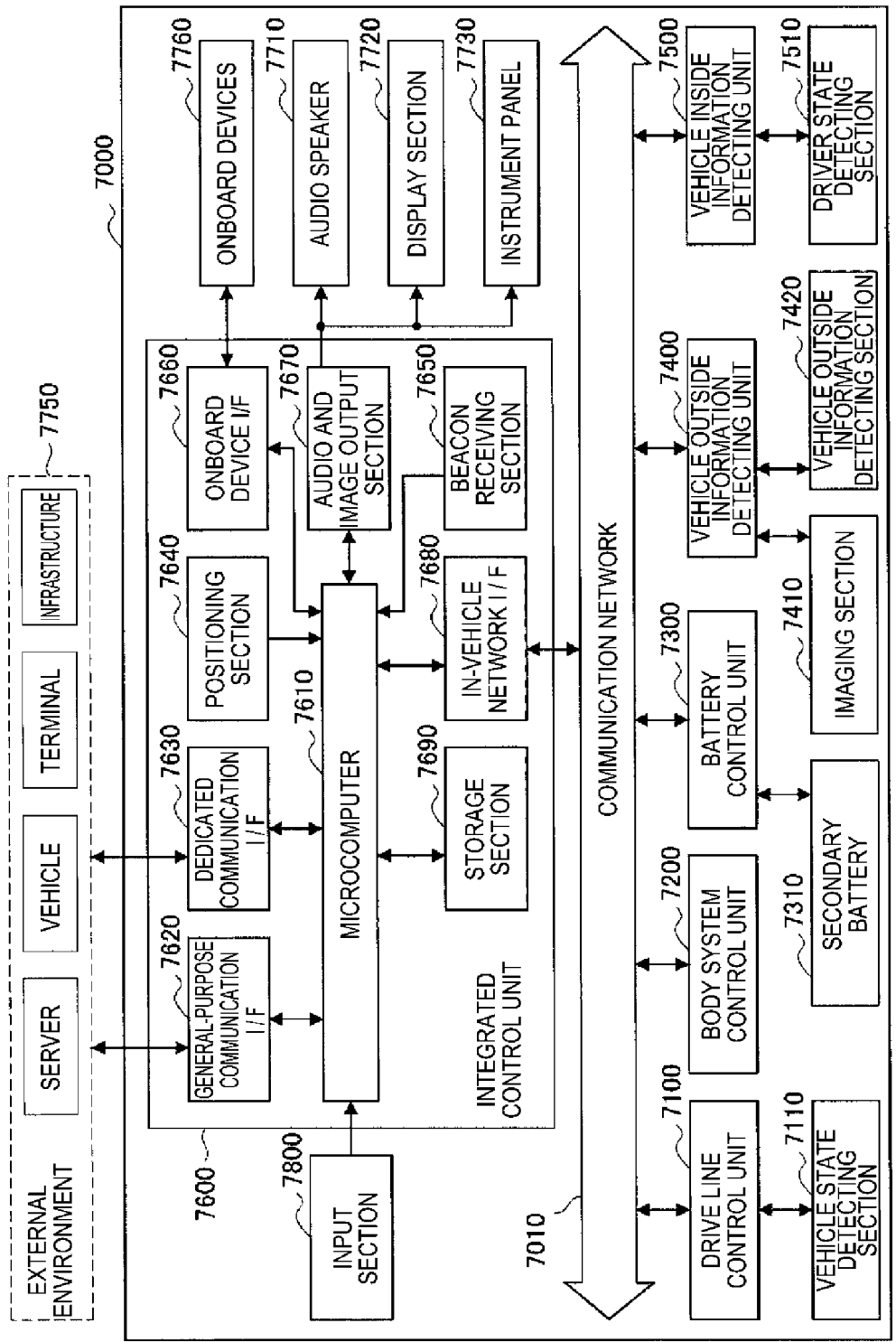
[Fig. 15]

[Fig. 16]
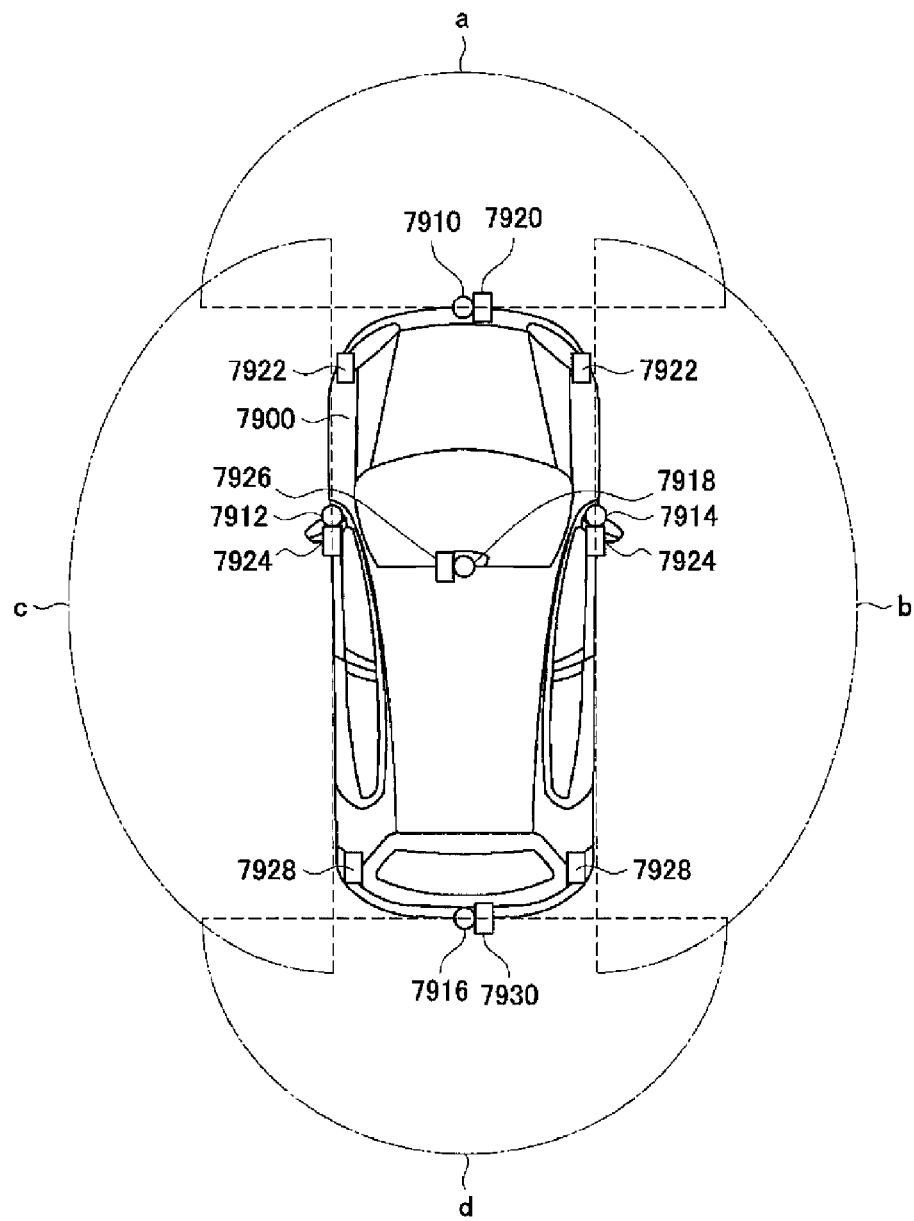

IMAGING DEVICE AND IMAGING METHOD

CROSS REFERENCE TO RELATED APPLICATIONS

This application claims the benefit of Japanese Priority Patent Application JP 2016-160547 filed Aug. 18, 2016, the entire contents of which are incorporated herein by reference.

TECHNICAL FIELD

The present technology relates to an imaging device and an imaging method, and makes it possible to generate a polarized image and a high-resolution non-polarized image.

BACKGROUND ART

There has been a proposal to acquire information such as polarization information that is not available from only a luminance image. For example, PTL 1 discloses a configuration in which unit structures including polarizers having different polarization directions are two-dimensionally arranged, a polarizer array is provided on a photosensitive cell array, and light passing through a single polarizer is incident on each photosensitive cell array. Such a configuration makes it possible to read out a polarized image from the photosensitive cell array. Further, normal information is acquired on the basis of a polarized image in PTL 2.

Further, PTL 3 discloses that a first photosensitive region and a second photosensitive region including a polarizer are provided to an image sensor, thereby making it possible to selectively reject sunlight reflected from a road surface and form an image from light from another object.

CITATION LIST

Patent Literature

PTL 1: WO 2012/017600
PTL 2: JP 2015-114307A
PTL 3: JP 2011-526105T

SUMMARY

Technical Problem

Incidentally, in a case where an imaging section is configured to have light passing through a single polarizer incident on a photosensitive cell, it is not possible to read out a non-polarized image. Further, in a case where the first photosensitive region and the second sensitive region including a polarizer are provided to an image sensor, the divided photosensitive regions decrease the resolution of a captured image as compared with the photosensitive region that is not divided.

The present technology then provides an imaging device and an imaging method that can generate a polarized image and a high-resolution non-polarized image.

Solution to Problem

A first embodiment of the present technology resides in an imaging device including: an imaging section configured to set pixels as polarization pixels having any of polarization directions, the pixels generating pixel signals on the basis of incident light; a polarization direction rotating section provided on an incidence plane side of the imaging section, and configured to rotate a polarization direction of the incident light; and a control section configured to control the imaging section and the polarization direction rotating section to generate a polarized image or a non-polarized image having higher resolution than resolution of the polarized image.

In an embodiment of the present disclosure, the pixels of the imaging section which generate the pixel signals on the basis of the incident light may be set as polarization pixels having any of the polarization directions. The polarization direction rotating section may be provided on the incidence plane side of the imaging section to rotate the polarization direction of the incident light incident on the imaging section. The control section may control the imaging section and the polarization direction rotating section, for example, to stop the rotation of the polarization direction by the polarization direction rotating section and generate the polarized image. The control section may cause the polarization direction rotating section to rotate the polarization direction of the incident light n (where n represents a natural number) times as large as 180 degrees at constant speed during an exposure period of the imaging section, thereby generating the non-polarized image having higher resolution than the resolution of the polarized image. Further, the control section may generate the non-polarized image by using images obtained by performing imaging at rotational positions in the polarization direction. For example, the control section may perform imaging at a position at which a polarization direction of the polarization direction rotating section is equal to a polarization direction of a polarization pixel of the imaging section. In this case, there may be provided an image signal processing section configured to combine images for each pixel to generate the non-polarized image, the images being obtained by the imaging section performing imaging two or more times.

Further, in a case where the non-polarized image is generated, the control section may stop a light emitting section from emitting illumination light. Moreover, the control section may generate the polarized image in an imaging operation that uses a light emitting section.

The polarization direction rotating section may include a half-wave plate, and a rotation driving section that rotates the half-wave plate by using an optical axial direction of the incident light as a rotation axis. Further, the polarization direction rotating section may include a liquid crystal element having a characteristic of rotating a polarization direction. Moreover, the polarization direction rotating section may be attachable and detachable. In a case where the polarization direction rotating section is detached, and in a case where the polarization direction rotating section stops rotation of the polarization direction, the control section may generate the polarized image.

A second embodiment of the present technology resides in an imaging method including: controlling, by a control section, an imaging section and a polarization direction rotating section positioned on an incident plane side of the imaging section, and generating a polarized image or a non-polarized image having higher resolution than resolution of the polarized image, the imaging section setting pixels as polarization pixels having any of polarization directions, the pixels generating pixel signals on the basis of incident light.

Advantageous Effects of Invention

According to an embodiment of the technology, it is possible to control, by a control section, an imaging section and a polarization direction rotating section positioned on an incident plane side of the imaging section, and generate a polarized image or a non-polarized image having higher resolution than resolution of the polarized image, the imaging section setting pixels as polarization pixels having any of polarization directions, the pixels generating pixel signals on the basis of incident light. Additionally, the effects described herein are merely exemplified effects, but not limitative. The effects described herein may also be additional effects.

BRIEF DESCRIPTION OF DRAWINGS

FIG. 1 is a diagram exemplifying a configuration of an imaging device.

FIG. 2 is a diagram exemplifying a configuration of an imaging section.

FIG. 3 is a flowchart illustrating an operation of the imaging device.

FIG. 4 is a flowchart illustrating an imaging setting process.

FIG. 5 is a flowchart illustrating an interrupt process.

FIG. 6 is a diagram for describing a relationship between incident light, a rotational angle of a polarization direction, and incident light of the imaging section, and signal strength of a polarization pixel in the imaging section (in a case where a rotational angle of a half-wave plate is "θ=90°").

FIG. 7 is a diagram for describing a relationship between incident light, a rotational angle of a polarization direction, and incident light of the imaging section, and signal strength of a polarization pixel in the imaging section (in a case where a rotational angle of a half-wave plate is "θ=67.5°").

FIG. 8 is a diagram for describing a relationship between incident light, a rotational angle of a polarization direction, and incident light of the imaging section, and signal strength of a polarization pixel in the imaging section (in a case where a rotational angle of a half-wave plate is "θ=45°").

FIG. 9 is a diagram for describing a relationship between incident light, a rotational angle of a polarization direction, and incident light of the imaging section, and signal strength of a polarization pixel in the imaging section (in a case where a rotational angle of a half-wave plate is "θ=22.5°").

FIG. 10 is a diagram illustrating signal strength of each of pixels having different polarization directions when the polarization directions are rotated 180 degrees at constant speed.

FIG. 11 is a diagram for describing a relationship between incident light, a rotational angle of a polarization direction, and incident light of the imaging section, and signal strength of a polarization pixel in the imaging section (in a case where a liquid crystal element is used), and exemplifying the configuration of the imaging device.

FIG. 12 is a diagram exemplifying another configuration of the imaging device.

FIG. 13 is a diagram exemplifying another configuration of the imaging section.

FIG. 14 is a diagram exemplifying a combination of a color mosaic filter and a polarizing filter.

FIG. 15 is a block diagram illustrating an example of a schematic configuration of a vehicle control system.

FIG. 16 is an explanatory diagram illustrating an example of installation positions of a vehicle outside information detecting section and the imaging section.

DESCRIPTION OF EMBODIMENTS

The following describes an embodiment of the present technology. Description will be given in the following order.

1. Configuration of Imaging Device
2. Operation of Imaging Device
2-1. First Imaging Operation of High-resolution Non-polarized Imaging Mode
2-2. Second Imaging Operation of High-resolution Non-polarized Imaging Mode
2-3. Imaging Operation of Polarized Imaging Mode
3. Another Configuration of Imaging Device
4. Application <1. Configuration of Imaging Device>

FIG. 1 exemplifies the configuration of an imaging device. An imaging device 10 includes a polarization direction rotating section 11, a lens system block 12, an imaging section 13, an image signal processing section 14, a display section 15, an image saving section 16, a user interface section 17, and a control section 20. Further, the imaging device 10 may include an attachment and detachment detecting section 18 and a light emitting section 19.

The polarization direction rotating section 11 includes a polarizing element 111 and a rotation driving section 112. The polarizing element 111 is an optical element having a function of rotating a polarization direction. The polarizing element 111 is, for example, a half-wave plate, a liquid crystal variable polarizing plate, or the like. The rotation driving section 112 drives the polarizing element 111 on the basis of an instruction from the control section 20, and rotates the polarization direction of incident light incident on the imaging section 13.

The lens system block 12 includes a focus lens or a zoom lens, a diaphragm mechanism, and the like. Further, the lens system block 12 includes a driving section that drives the lens and the diaphragm mechanism on the basis of an instruction from the control section 20. The lens system block 12 controls the position of the focus lens or the zoom lens on the basis of an instruction from the control section 20, and forms an object optical image on the exposed surface of the imaging section 13. The lens system block 12 controls the opening degree of the diaphragm on the basis of an instruction from the control section 20, and adjusts the amount of incident light (object light). Additionally, the positions of the focus lens or the zoom lens, and the diaphragm may be mechanically movable by a user operation.

The imaging section 13 includes a complementary metal oxide semiconductor (CMOS) image sensor, charge coupled device (CCD) image sensor, or the like. Further, the imaging section 13 includes a polarizing filter on the incidence plane of an image sensor. The polarizing filter includes pixels having polarization directions. The pixels, which generate pixel signals on the basis of incident light, are set as polarization pixels having any of polarization directions. FIG. 2 exemplifies the configuration of the imaging section. The imaging section 13 has a polarizing filter 132 disposed on the incidence plane of an image sensor 131. For example, in a case where normal information is acquired from a polarized image as disclosed in PTL 2, a polarizing filter is used that includes pixels having three or more polarization directions. FIG. 2 exemplifies a case where the image sensor has on the incidence plane the polarizing filter 132 including pixels having the four respective types of polarization directions, for example, "0°, 45°, 90°, and 135° (polarization directions are represented by arrows)." The imaging section 13 outputs the generated image signal of a polarized image to the image signal processing section 14. Additionally, a pixel having a polarization direction of "0°" is represented as a polarization pixel C1, a pixel having a polarization direction of "45°" is represented as a polarization pixel C2, a pixel having a polarization direction of 90°" is represented as a polarization pixel C3, and a pixel having a polarization direction of "135°" is represented as a polarization pixel C4.

The image signal processing section 14 performs various types of image processing such as a noise reduction process, a gain adjustment process, a deficient pixel correction process, a de-mosaic process, a color adjustment process, and a resolution conversion process on the image signal output from the imaging section 13. Further, the image signal processing section 14 switches polarization directions at predetermined angular intervals with the polarization direction rotating section 11 to perform bracket-imaging, and combines, for each pixel, polarized images resulting from the bracket-imaging to generate a non-polarized image. The image signal processing section 14 outputs the processed image signal to the display section 15 and the image saving section 16. Additionally, the image signal processing section 14 superimposes a display signal on the image signal, and outputs the superimposed display signal to the display section 15 and the like on the basis of the control from the control section 20. The display signal is used, for example, to display a menu for making it possible to check a setting operation and a setting state of the imaging device 10, and information relating to a setting state at the time of imaging.

The display section 15 includes a liquid crystal display, an organic electro luminescence (EL) display, or the like. The display section 15 displays a captured image and various types of information on the screen. For example, the display section 15 displays a through image on the screen on the basis of image data output from the image signal processing section 14. Further, the display section 15 displays a reproduced image on the screen when an image recorded on the image saving section 16 is reproduced by the image signal processing section 14. Moreover, the display section 15 displays a menu and information.

The image saving section 16 stores image data output from the image signal processing section 14, and metadata (such as the date and time, or the like when the image data is acquired) relating to the image data. The image saving section 16 includes, for example, a semiconductor memory, an optical disc, a hard disk (HD), or the like. The image saving section 16 may also be fixed and provided in the imaging device 10, or provided to the imaging device 10 in an attachable and detachable manner.

The user interface section 17 includes a shutter button, an operation switch, a touch panel, or the like. The user interface section 17 generates the operation signal corresponding to a user operation on the shutter button, the variety of operation switches, the touch panel, or the like, and outputs the generated operation signal to the control section 20.

Further, in a case where the polarization direction rotating section 11 is attachable to and detachable from the imaging device 10, the attachment and detachment detecting section 18 is provided that detects whether the polarization direction rotating section 11 is attached to the imaging device 10. The attachment and detachment detecting section 18 includes a switch, a sensor, or the like. The attachment and detachment detecting section 18 generates a detection signal indicating whether the polarization direction rotating section 11 is attached to the imaging device 10, and outputs the generated detection signal to the control section 20. The light emitting section 19 includes a strobe or the like. The light emitting section 19 emits illumination light on the basis of a driving signal from the control section 20.

The control section 20 includes a central processing unit (CPU), a read only memory (ROM), a random access memory (RAM), and the like. The read only memory (ROM) stores a variety of programs that are executed by the central processing unit (CPU). The random access memory (RAM) stores information such as a variety of parameters. The CPU executes a variety of programs stored in the ROM, controls each section on the basis of an operation signal from the user interface section 17 in a manner that an imaging operation is performed in the imaging device 10 in the operation mode corresponding to a user operation.

Further, in a case where a high-resolution non-polarized imaging mode is selected that is an operation mode in which a high-resolution non-polarized image is captured, the control section 20 controls the rotation of the polarization direction of the polarizing element 111 and the driving of the imaging section 13 in the polarization direction rotating section 11, and generates the image signal corresponding to an object with each polarization pixel. Further, in a case where the polarized imaging mode is selected that is an operation mode in which a polarized image is captured, the control section 20 uses the polarization direction of the polarizing element 111 as a predetermined rotational position to allow the imaging section 13 to generate an image signal. Moreover, in a case where the polarization direction rotating section 11 is attachable to and detachable from the imaging device 10, and the polarization direction rotating section 11 is detached from the imaging device 10, the control section 20 is incapable of controlling the rotation of the polarization direction rotating section 11. Thus, in a case where it is determined on the basis of a detection signal from the attachment and detachment detecting section 18 that the polarization direction rotating section 11 is detached from the imaging device 10, the control section 20 sets the polarized imaging mode as the operation mode. Further, the control section 20 sets the operation of the light emitting section 19 in accordance with the imaging mode, or the imaging mode in accordance with the operation of the light emitting section 19.

<2. Operation of Imaging Device>

Next, the operation of the imaging device will be described. FIG. 3 is a flowchart illustrating the operation of the imaging device. In step ST1, the control section performs an imaging setting process. FIG. 4 is a flowchart illustrating the imaging setting process.

In step ST11, the control section acquires imaging mode determination information. The control section 20 acquires user setting information relating to an imaging mode, information indicating the attachment and detachment state of the polarization direction rotating section 11, strobe setting information, and the like as the imaging mode determination information, and proceeds to step ST12.

In step ST12, the control section determines whether to set the high-resolution non-polarized imaging mode as the imaging mode. The control section 20 determines whether to set the high-resolution non-polarized imaging mode as the imaging mode, on the basis of the acquired imaging mode determination information. For example, in a case where the polarization direction rotating section 11 is not attached to the imaging device 10, the control section 20 does not permit a user to select the high-resolution non-polarized imaging mode in this case because the polarization direction rotating section 11 is not available. Further, if illumination light is emitted while the polarization direction is rotated by the polarization direction rotating section 11, the luminance of an object changes while the polarization direction is rotated. Thus, for example, in a case where the light emitting section 19 is set to be used, the control section 20 does not permit a user to select the high-resolution non-polarized imaging mode. Alternatively, in a case where a user selects the high-resolution non-polarized imaging mode, control may be performed in a manner that no light is emitted even if the light emitting section 19 is set to be used. In a case where a user selects the high-resolution non-polarized imaging mode, the control section 20 determines that the imaging mode is the high-resolution non-polarized imaging mode, and proceeds to step ST13. Further, in a case where the high-resolution non-polarized imaging mode is not selected, namely in a case where a user selects the polarized imaging mode, the control section 20 proceeds to step ST15. Additionally, in a case where illumination light is necessary for imaging and the control section 20 can use the light emitting section 19 even if a user selects the high-resolution non-polarized imaging mode, illumination light is sometimes emitted and causes a change in the luminance of an object while the polarization direction is rotated. If the luminance of an object changes in this way, it is not possible to acquire the high-resolution non-polarized image corresponding to the luminance of the object as described below. Thus, in a case where it is necessary to use the light emitting section 19, the polarized imaging mode is set as the imaging mode.

In step ST13, the control section performs a high-resolution non-polarized imaging mode setting process. The control section 20 performs imaging setting such as exposure time of the imaging section 13 or imaging intervals for bracket-imaging, or sets the rotation speed of the polarization direction in the polarization direction rotating section 11 in accordance with the luminance of an object or the like, and proceeds to step ST14.

In step ST14, the control section performs an operation of rotating the polarization direction. The control section drives the polarization direction rotating section 11 in a manner that the rotation speed of the polarization direction in the polarization direction rotating section 11 is equal to the speed set in the step ST13. The control section then proceeds to step ST2 of FIG. 3.

In step ST15, the control section performs a polarized imaging mode setting process. The control section 20 performs imaging setting such as exposure time in accordance with the luminance of an object or user setting, and proceeds to step ST2 of FIG. 3.

In step ST2, the control section performs a through image display process. The control section 20 controls the imaging section 13 on the basis of the imaging setting in step ST1 and causes the imaging section 13 to generate an image signal. The control section 20 displays a through image on the display section 15, and proceeds to step ST3.

In step ST3, the control section determines whether imaging ends. In a case where the operation mode of the imaging device is not switched from the operation mode in which an object is imaged and a recorded image is saved to another operation mode, and in a case where an end operation is not performed to end the operation of the imaging device, the control section 20 determines that imaging does not end. The control section 20 then returns to step ST1. Further, in a case where an operation of switching the operation mode to another operation mode or an end operation is performed, the control section 20 ends the operation.

In a case where a shutter operation is performed while the control section is performing the processes from step ST1 to step ST3 illustrated in FIG. 3, the control section performs an interrupt process illustrated in FIG. 5. In step ST21, the control section performs a recorded image generating process. In a case where the imaging mode is the high-resolution non-polarized imaging mode, the control section 20 drives the imaging section 13 in the imaging setting of the high-resolution non-polarized imaging mode setting process to generate an image signal of a high-resolution non-polarized captured image. Further, in a case where the imaging mode is the polarized imaging mode, the control section 20 drives the imaging section 13 in the imaging setting of the polarized imaging mode setting process to generate an image signal of a polarized captured image. The control section 20 generates an image signal of a high-resolution non-polarized image or a polarized image, and proceeds to step ST22. Additionally, the imaging operation of the high-resolution non-polarized imaging mode will be described below.

In step ST22, the control section performs an image saving process. The control section 20 outputs the image signal generated in step ST21 to the image signal processing section 14 and performs a variety of processes. The control section 20 causes the image saving section 16 to store the processed image signal, and ends the interrupt process.

<2-1. First Imaging Operation of High-Resolution Non-Polarized Imaging Mode>

Next, a first imaging operation of the high-resolution non-polarized imaging mode in the imaging device will be described. In a case where the imaging device is set in the high-resolution non-polarized imaging mode, the imaging device controls the rotation of the polarization direction of the polarizing element 111 and the driving of the imaging section 13 in the polarization direction rotating section 11, and generates the pixel signal corresponding to an object with each polarization pixel.

FIGS. 6 to 9 are diagrams for describing the relationship between incident light, the rotational angle of polarization direction, and the incident light of the imaging section in a case where a half-wave plate 111a is used as the polarizing element 111, and the signal strength of a polarization pixel in the imaging section. FIGS. 6 to 9 respectively illustrates a case where the rotational angle of the half-wave plate 111a is "θ=90°," a case where the rotational angle of the half-wave plate 111a is "θ=67.5°," a case where the rotational angle of the half-wave plate 111a is "θ=45°," and a case where the rotational angle of the half-wave plate 111a is "θ=22.5°." Further, the imaging section 13 is assumed to have the polarizing filter 132 disposed on the incidence plane of the image sensor 131. The polarizing filter 132 includes a 2×2 pixel block constituted of pixels having polarization directions of 0°, 45°, 90°, and 135°.

For example, if the optical axis of the half-wave plate 111a is inclined θ with respect to the polarization direction of incident light LA when a linear polarization component LA having a polarization direction of "0°" is vertically incident on the half-wave plate 111a, the incident light LA passes through the half-wave plate 111a, thereby causing incident light LB (2θ) to be incident on the imaging section 13. The incident light LB has the polarization direction rotated "2θ."

For example, if the optical axis of the half-wave plate 111a has an inclination of "θ=90°" with respect to the polarization direction of the incident light LA as illustrated in A of FIG. 6, the incident light LB (2θ) is obtained by rotating the polarization direction of the incident light LA "180°," namely the incident light LB has the same polarization direction as the polarization direction of the incident light LA. As illustrated in B of FIG. 6, the polarization pixel C1 having a polarization direction of "0°" thus has the greatest signal strength "V3," and the polarization pixel C3 having a polarization direction of "90°" has the least signal strength "V1" among the 2×2 pixel block in the imaging section 13. Further, the polarization pixel C2 having a polarization direction of "45°" and the polarization pixel C4 a polarization direction of "135°" have intermediate signal strength "V2."

If the optical axis of the half-wave plate 111a has an inclination of "θ=67.5°" with respect to the polarization direction of the incident light LA as illustrated in A of FIG. 7, the incident light LB (2θ) is obtained by rotating the polarization direction of the incident light LA "135°." As illustrated in B of FIG. 7, the polarization pixel C4 having a polarization direction of "135°" thus has the greatest signal strength "V3," and the polarization pixel C2 having a polarization direction of "45°" has the least signal strength "V1" among the 2×2 pixel block in the imaging section 13. Further, the polarization pixel C1 having a polarization direction of "0°" and the polarization pixel C3 a polarization direction of "90°" have intermediate signal strength "V2."

If the optical axis of the half-wave plate 111a has an inclination of "θ=45°" with respect to the polarization direction of the incident light LA as illustrated in A of FIG. 8, the incident light LB (2θ) is obtained by rotating the polarization direction of the incident light LA "90°." As illustrated in B of FIG. 8, the polarization pixel C3 having a polarization direction of "90°" thus has the greatest signal strength "V3," and the polarization pixel C1 having a polarization direction of "0°" has the least signal strength "V1" among the 2×2 pixel block in the imaging section 13. Further, the polarization pixel C2 having a polarization direction of "45°" and the polarization pixel C4 a polarization direction of "135°" have intermediate signal strength "V2."

If the optical axis of the half-wave plate 111a has an inclination of "θ=22.5°" with respect to the polarization direction of the incident light LA as illustrated in A of FIG. 9, the incident light LB (2θ) is obtained by rotating the polarization direction of the incident light LA "45°." As illustrated in B of FIG. 9, the polarization pixel C2 having a polarization direction of "45°" thus has the greatest signal strength "V3," and the polarization pixel C4 having a polarization direction of "135°" has the least signal strength "V1" among the 2×2 pixel block in the imaging section 13. Further, the polarization pixel C1 having a polarization direction of "0°" and the polarization pixel C3 a polarization direction of "90°" have intermediate signal strength "V2."

Further, the same applies to a component having another polarization direction in incident light. The polarization direction of the incident light LA is rotated and incident on the imaging section 13 in accordance with the inclination of the optical axis of the half-wave plate 111a with respect to the polarization direction of the incidence light LA. Further, a pixel signal is generated in the imaging section 13 in accordance with the incident light LB (2θ).

The half-wave plate 111a thus has "n/4 (where n represents a natural number)" rotations, and the rotation speed and the exposure period are set in the high-resolution non-polarized imaging mode setting process in the flowchart of FIG. 3 in a manner that the "n/4 (where n represents a natural number)" rotation period is the exposure period. That is, the polarization direction is rotated n (where n represents a natural number) times as large as 180 degrees at constant speed during the exposure period, thereby allowing the respective polarization pixels having different polarization directions in the 2×2 pixel block to have the constant signal strength in spite of the difference in the polarization directions as illustrated in FIG. 10. It is therefore possible to generate an image signal of a high-resolution non-polarized image which indicates the signal level corresponding to the incident light LA for each polarization pixel.

Further, in addition to a case where the "n/4 (where n represents a natural number)" rotation period is set as the exposure period, a non-polarized image may be generated by using images obtained by performing imaging at rotational positions in the polarization direction. In this case, the control section 20 sets the rotation speed and the bracket-imaging intervals in a manner that bracket-imaging is performed in accordance with the polarization directions of polarization pixels during the period during which the polarization direction of the incident light LA is rotated n (where n represents a natural number) times as large as 180° with the half-wave plate 111a. For example, the control section 20 performs imaging at the position at which the polarization direction rotated with the half-wave plate 111a is equal to the polarization direction of a polarization pixel of the imaging section 13. Specifically, imaging is performed at the positions at which the polarization direction is "0°," "45°," "90°," and "135°" during the period during which the polarization direction is rotated 180° with the half-wave plate 111a. Combining the polarized images obtained from bracket-imaging for each pixel, and, for example, averaging or adding the pixel values for each pixel in these imaging setting and rotation speed setting allow the respective polarization pixels having different polarization directions in the 2×2 pixel block to have the constant signal strength in spite of the difference in the polarization directions. It is therefore possible to generate an image signal of a high-resolution non-polarized image which indicates the signal level corresponding to the incident light LA for each pixel. Further, bracket-imaging makes it possible to acquire not only a high-resolution non-polarized image, but also a polarized image concurrently. Moreover, performing imaging at the timing at which the polarization direction rotated with the half-wave plate 111a is equal to the polarization direction of a polarization pixel of the imaging section 13 makes it possible to obtain the greatest signal strength of a polarization pixel. That is, it is possible to generate a polarized image having high sensitivity. Further, in a case where the rotation of the half-wave plate 111a is stopped, and the polarization direction of the incident light LA is parallel or vertical to the optical axis (in a case where the rotation is stopped and the polarization direction of the incident light LA is vertical to the optical axis as illustrated in FIG. 6), the incident light LA is incident on the imaging section 13 with no change in the polarization direction. Further, in a case where the polarization direction of the incident light LA is inclined, for example, "45°" with respect to the optical axis (in a case where the rotation is stopped and the polarization direction of the incident light LA is inclined "45°" with respect to the optical axis as illustrated in FIG. 7), and inclined "135°" (in a case where the rotation is stopped and the polarization direction of the incident light LA is inclined "135°" with respect to the optical axis as illustrated in FIG. 9), the polarization pixels whose polarization directions agree with each other replace each other. Thus, in a case where the image signal processing section 14 processes a signal of each pixel when stopping the rotation of the half-wave plate 111a to perform imaging, the image signal processing section 14 attempts to automatically switch the process to a process of using a signal generated with a pixel having the polarization direction vertical or parallel to the optical axis as a signal indicating a polarization component whose polarization direction agrees with the vertical or parallel polarization direction of the pixels in incident light, and a signal generated with a pixel whose polarization direction is not vertical or parallel to the optical axis as a signal indicating a polarization component in incident light which is rotated with the half-wave plate 111a in accordance with the angular difference between the optical axis and the polarization direction of the pixel.

Further, in the high-resolution non-polarized imaging mode, as described above, bracket-imaging is performed during the exposure period that is the "n/4 (where n represents a natural number)" rotation period or the period during which the polarization direction of the incident light LA is rotated n times (where n represents a natural number) as large as 180° with the half-wave plate 111a. A change in the luminance of an object during this period therefore varies the signal strength among polarization pixels, and it is not possible to acquire the high-resolution non-polarized image corresponding to the luminance of the object. The polarized imaging mode is thus set as the imaging mode under the imaging condition under which the luminance of an object changes during this period. Further, in a case where the high-resolution non-polarized imaging mode is selected, the imaging condition may be limited. For example, as described above, in a case where the light emitting section 19 is used to perform imaging, a user is not permitted to select the high-resolution non-polarized imaging mode. In a case where the high-resolution non-polarized imaging mode is selected, a user is not permitted to use the light emitting section 19.

Further, in a case where the half-wave plate 111a is rotated at high speed, the difference in the rotational angle can also be ignored as an error even when the half-wave plate 111a does not have n/4 rotations. It is possible to do without a mechanism that accurately controls the rotation speed in accordance with the exposure period.

In this way, the imaging section that uses pixels for generating pixel signals on the basis of incident light as polarization pixels having any of the polarization directions, and the polarization direction rotating section that is provided on the incidence plane side of the imaging section and rotates the polarization direction of incident light are used and controlled as described above, thereby making it possible to generate not only polarized images, but also non-polarized images. Further, in a case where the polarizing filter has the configuration illustrated, for example, in FIG. 2, one of every 2×2 pixels has the same polarization direction. Accordingly, a polarized image that uses pixels having the same polarization directions is an image including half the number of pixels in the vertical and horizontal directions. An image signal of non-polarized image acquired in the high-resolution non-polarized imaging mode, however, indicates the signal level corresponding to the incident light LA for each pixel. The non-polarized image includes twice as many pixels in the vertical and horizontal directions as a polarized image. It is then possible to acquire a non-polarized image having higher resolution than the resolution of a polarized image.

<2-2. Second Imaging Operation of High-Resolution Non-Polarized Imaging Mode>

Next, a second imaging operation of the high-resolution non-polarized imaging mode will be described. In the second imaging operation, a liquid crystal variable polarizing plate 111b is used as the polarizing element 111. The liquid crystal variable polarizing plate 111b has a characteristic of rotating a polarization direction. The liquid crystal variable polarizing plate 111b includes a nematic liquid crystal.

FIG. 11 is a diagram for describing the relationship between incident light, the rotational angle of polarization direction, and the incident light of the imaging section in a case where the liquid crystal variable polarizing plate 111b is used as the polarizing element 111, the driving of the liquid crystal element, and the signal strength of a polarization pixel in the imaging section.

As illustrated in A of FIG. 11, the incident light LA passes through the liquid crystal variable polarizing plate 111b, thereby being incident on the imaging section 13 as the incident light LB with the polarization direction rotated within a range of "0° to 180°." As illustrated in B of FIG. 11, the polarization direction of the liquid crystal variable polarizing plate 111b is rotated from "0°" to "180°" and then from "180°" to "0°" over time at constant angular velocity on the basis of driving signals from the rotation driving section 112. The polarization direction will be similarly rotated below.

The control section 20 sets the period during which the polarization direction is rotated from "0°" to "180°" or the period during which the polarization direction is rotated from "180°" to "0°" as the exposure period. In this case, as illustrated in C of FIG. 11, the respective polarization pixels having different polarization directions in the 2×2 pixel block have the constant signal strength in spite of the difference in the polarization directions. It is then possible to generate an image signal of a high-resolution non-polarized image indicating the signal level corresponding to the incident light LA for each pixel.

Further, the control section 20 may perform bracket-imaging, and equalize the polarization direction of the liquid crystal variable polarizing plate 111b with the polarization direction of a polarization pixel to perform imaging two or more times. For example, imaging is performed with the polarization direction of the liquid crystal variable polarizing plate 111b set at "0°," "45°," "90°," and "135°." Combining the polarized images obtained from bracket-imaging for each pixel in these imaging setting and rotation speed setting allow the respective polarization pixels having different polarization directions in the 2×2 pixel block to have the constant signal strength in spite of the difference in the polarization directions. It is therefore possible to generate an image signal of a high-resolution non-polarized image which indicates the signal level corresponding to the incident light LA for each pixel. Further, bracket-imaging makes it possible to acquire not only a high-resolution non-polarized image, but also a polarized image concurrently. Further, performing imaging in the state in which the polarization direction of the liquid crystal variable polarizing plate 111b is equal to the polarization direction of a polarization pixel of the imaging section 13 makes it possible to obtain the greatest signal strength of a polarization pixel. That is, it is possible to generate a polarized image having high sensitivity.

Additionally, in a case where it is possible to sufficiently shorten the cycle for changing the polarization direction between "0°" and "180°" as compared to the exposure period, the cycle for changing the polarization direction does not have to be accurately set at (1/n) of the exposure period, but it is possible to ignore fractions as an error. It is therefore possible to do without a mechanism that accurately controls the frequency of a driving signal for changing the polarization direction in accordance with the exposure period.

In this way, even in a case where the liquid crystal variable polarizing plate is used as the polarization direction rotating section, it is possible to generate not only a polarized image, but also a non-polarized image having higher resolution than the resolution of the polarized image similarly to a case where the half-wave plate is used. Further, the use of the liquid crystal variable polarizing plate as the polarization direction rotating section eliminates a movable section. It is then possible to generate a high-resolution non-polarized image in a simple configuration.

<2-3. Imaging Operation of Polarized Imaging Mode>

In a case of the polarized imaging mode, the control section 20 performs imaging without rotating the polarization direction of the polarizing element 111 or using the polarizing element 111. In this case, the pixel signal having the signal strength corresponding to the polarization component of the incident light LA that relates to the polarization direction of each pixel is generated in each of the pixels having different polarization directions in the 2×2 pixel block in the imaging section 13. Pixels signals having the same polarization direction are thus used for each polarization direction, thereby making it possible to generate a polarized image indicating the polarization component corresponding to the polarization direction for each polarization direction.

<3. Another Configuration of Imaging Device>

In the above-described embodiment, the configuration is exemplified in which the polarization direction rotating section 11 is provided on the incidence plane side of the lens system block 12. However, the polarization direction rotating section 11 only has to be provided at a position on the incidence plane side of the imaging section 13. FIG. 12 exemplifies another configuration of the imaging device. An imaging device 10a includes the polarization direction rotating section 11 between the lens system block 12 and the imaging section 13.

Figure 13:
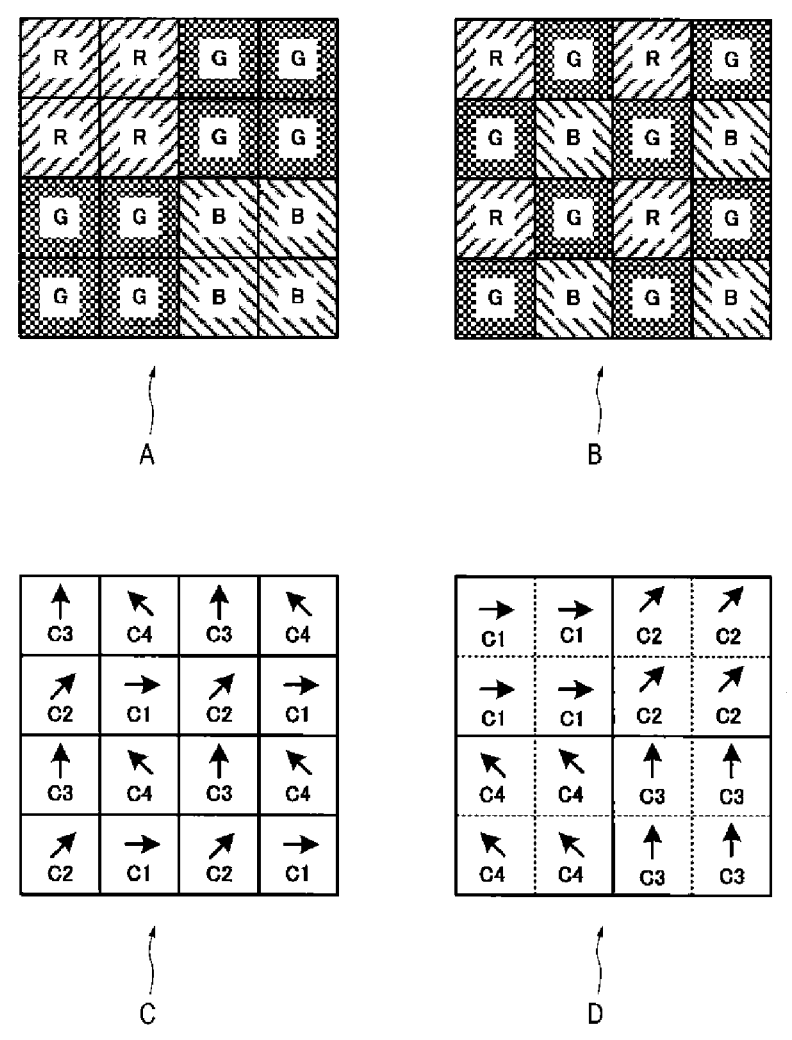

Further, the imaging section does not have to include the polarizing filter having a different polarization angle for each pixel as illustrated in FIG. 2, but may include a polarizing filter having a different polarization angle in units of multiple pixels. Moreover, a color mosaic filter may also be used for the imaging section. FIG. 13 exemplifies another configuration of the imaging section. Additionally, A and B of FIG. 13 exemplify color patterns, while C and D of FIG. 13 exemplify polarization patterns. The color patterns are color arrangements in which 2×2 pixels serve a color unit as illustrated in A of FIG. 13, and pixel blocks each serving as a color unit are arranged as the Bayer arrangement. Further, B of FIG. 13 illustrates a case where a single pixel serves as a color unit, and the Bayer arrangement is used as the color arrangement. As a polarization pattern, a single pixel may serve as a polarization component unit, and 2×2 polarization component units are repeated as polarization component units having four different polarization directions as illustrated in C of FIG. 13. Further, 2×2 pixels may serve as a polarization component unit, and 2×2 polarization component units may be repeated as polarization component units having four different polarization directions as illustrated in D of FIG. 13. Further, FIG. 13 exemplifies a case where each pixel is provided with a polarizing filter, but pixels with no polarizing filters may also be mixed.

The color patterns and the polarization patterns are combined with each other in a manner that four polarization components can be acquired for each color component. FIG. 14 exemplifies a combination of a color mosaic filter and a polarizing filter.

A of FIG. 14 illustrates a case where color mosaic filters configured as illustrated in A of FIG. 13, and polarizing filters configured as illustrated in C of FIG. 13 are used. Each color component unit includes a pixel having each polarization direction, and four polarization components can be acquired for each color component in this combination. B of FIG. 14 illustrates a case where color mosaic filters configured as illustrated in A of FIG. 13, and polarizing filters configured as illustrated in D of FIG. 13 are used. The polarization component units of the polarizing filters whose phases are shifted by a single pixel in the horizontal and vertical directions are applied to the color component units of the color mosaic filters in this combination, thereby making it possible to include pixels of the respective polarization directions in each color component unit and acquire four polarization components for each color component.

In a case where the polarizing filter has a polarization component unit of 2×2 pixels, the ratio of leakage of polarization components from regions of different polarization component units adjacent to each other in polarization components acquired for each polarization component unit is lower than a case of 1×1 pixel. Further, in a case where the polarizing filter is a wire grid polarizer, polarized light is transmitted that has an electric field component vertical to the grid direction (wire direction). The transmittance increases with a longer wire. Accordingly, a polarization component unit of 2×2 pixels leads to a higher transmittance than a polarization component unit of 1×1 pixel. The imaging section can thus have a more favorable extinction ratio by using the combination illustrated in B of FIG. 14 than by using the combination illustrated in A of FIG. 14. Further, a polarization component unit of 2×2 pixels causes polarization pixels to be more unevenly arranged than a polarization component unit of 1×1 pixel. The imaging section can thus have higher accuracy in polarization information by using the combination illustrated in A of FIG. 14 than by using the combination illustrated in B of FIG. 14.

C of FIG. 14 illustrates a case where color mosaic filters configured as illustrated in B of FIG. 13, and polarizing filters configured as illustrated in D of FIG. 13 are used. Each polarization component unit includes a pixel having each color component, and four polarization components can be acquired for each color component in this combination. Moreover, 1×1 pixel serves as a color component unit, and color component pixels are less unevenly arranged than in a case of 2×2 pixels. The imaging section can thus have higher image quality by using the combination illustrated in C of FIG. 14 than by using, for example, the combination illustrated in A of FIG. 14.

<4. Application>

The technology according to an embodiment of the present disclosure is applicable to a variety of products. For example, the technology according to an embodiment of the present disclosure is implemented not only as information processing terminals, but also as devices mounted on any type of mobile objects such as automobiles, electric vehicles, hybrid electric vehicles, motorcycles, bicycles, personal mobilities, airplanes, drones, ships, robots, construction machines, and agricultural machines (tractors).

FIG. 15 is a block diagram illustrating a schematic configuration example of a vehicle control system 7000 that is an example of a mobile object control system to which the technology according to an embodiment of the present disclosure can be applied. The vehicle control system 7000 includes electronic control units connected via a communication network 7010. In the example illustrated in FIG. 15, the vehicle control system 7000 includes a drive line control unit 7100, a body system control unit 7200, a battery control unit 7300, a vehicle outside information detecting unit 7400, a vehicle inside information detecting unit 7500, and an integrated control unit 7600. The communication network 7010, which connects these control units, may be an in-vehicle communication network such as a controller area network (CAN), a local interconnect network (LIN), a local area network (LAN), or FlexRay (registered trademark) that is compliant with any standard.

Each control unit includes a microcomputer that performs operation processing in accordance with a variety of programs, a storage section that stores the programs, parameters used for the variety of operations, or the like executed by the microcomputer, and a driving circuit that drives devices subjected to various types of control. Each control unit includes a network I/F used to communicate with the other control units via the communication network 7010, and a communication I/F used to communicate with devices, sensors, or the like outside and inside the vehicle through wired communication or wireless communication. FIG. 15 illustrates a microcomputer 7610, a general-purpose communication I/F 7620, a dedicated communication I/F 7630, a positioning section 7640, a beacon receiving section 7650, an onboard device I/F 7660, an audio and image output section 7670, an in-vehicle network I/F 7680, and a storage section 7690 as the functional configuration of the integrated control unit 7600. Each of the other control units similarly includes a microcomputer, a communication I/F, a storage section, and the like.

The drive line control unit 7100 controls the operation of devices related to the drive line of the vehicle in accordance with a variety of programs. For example, the drive line control unit 7100 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like. The drive line control unit 7100 may have the function of a control device for an antilock brake system (ABS) or an electronic stability control (ESC).

The drive line control unit 7100 is connected to a vehicle state detecting section 7110. The vehicle state detecting section 7110 includes, for example, at least one of sensors such as a gyro sensor that detects the angular velocity of the axial rotating motion of the vehicle body, an acceleration sensor that detects the acceleration of the vehicle, or a sensor that detects the operation amount of the accelerator pedal, the operation amount of the brake pedal, the steering wheel angle of the steering wheel, the engine speed, the wheel rotation speed, or the like. The drive line control unit 7100 uses a signal input from the vehicle state detecting section 7110 to perform operation processing, and controls the internal combustion engine, the driving motors, the electric power steering device, the braking device, or the like.

The body system control unit 7200 controls the operations of a variety of devices attached to the vehicle body in accordance with a variety of programs. For example, the body system control unit 7200 functions as a control device for a keyless entry system, a smart key system, a power window device, or a variety of lights such as a headlight, a backup light, a brake light, a blinker, or a fog lamp. In this case, the body system control unit 7200 can receive radio waves transmitted from a portable device that serves instead of the key or signals of a variety of switches. The body system control unit 7200 receives these radio waves or signals, and controls the vehicle door lock device, the power window device, the lights, or the like.

The battery control unit 7300 controls a secondary battery 7310 in accordance with a variety of programs. The secondary battery 7310 serves as a power supply source of a driving motor. For example, the battery control unit 7300 receives information such as the battery temperature, the battery output voltage, or the remaining battery capacity from a battery device including the secondary battery 7310. The battery control unit 7300 uses these signals to perform operation processing, and performs temperature adjusting control on the secondary battery 7310 or controls a cooling device or the like included in the battery device.

The vehicle outside information detecting unit 7400 detects information on the outside of the vehicle including the vehicle control system 7000. For example, the vehicle outside information detecting unit 7400 is connected to at least one of an imaging section 7410 and a vehicle outside information detecting section 7420. The imaging section 7410 includes at least one of a time of flight (ToF) camera, a stereo camera, a monocular camera, an infrared camera, and other cameras. The vehicle outside information detecting section 7420 includes, for example, at least one of an environment sensor that detects the current weather, and a surrounding information detecting sensor that detects another vehicle, an obstacle, a pedestrian, or the like around the vehicle including the vehicle control system 7000.

The environment sensor may be, for example, at least one of a raindrop sensor that detects rainy weather, a fog sensor that detects a fog, a sunshine sensor that detects the degree of sunshine, a snow sensor that detects a snowfall. The surrounding information detecting sensor may be at least one of an ultrasonic sensor, a radar device, and a light detection and ranging/laser imaging detection and ranging (LIDAR) device. These imaging section 7410 and vehicle outside information detecting section 7420 may be installed as independent sensors or devices, or as a device into which sensors and devices are integrated.

FIG. 16 illustrates an example of installation positions of the imaging section 7410 and the vehicle outside information detecting section 7420. Imaging sections 7910, 7912, 7914, 7916, and 7918 are positioned, for example, at at least one of the front nose, a side mirror, the rear bumper, the back door, and the upper part of the windshield in the vehicle compartment of a vehicle 7900. The imaging section 7910 attached to the front nose and the imaging section 7918 attached to the upper part of the windshield in the vehicle compartment chiefly acquire images of the area ahead of the vehicle 7900. The imaging sections 7912 and 7914 attached to the side mirrors chiefly acquire images of the areas on the sides of the vehicle 7900. The imaging section 7916 attached to the rear bumper or the back door chiefly acquires images of the area behind the vehicle 7900. The imaging section 7918 attached to the upper part of the windshield in the vehicle compartment is used chiefly to detect a preceding vehicle, a pedestrian, an obstacle, a traffic light, a traffic sign, a lane, or the like.

Additionally, FIG. 16 illustrates an example of the respective imaging ranges of the imaging sections 7910, 7912, 7914, and 7916. An imaging range a represents the imaging range of the imaging section 7910 attached to the front nose. Imaging ranges b and c respectively represent the imaging ranges of the imaging sections 7912 and 7914 attached to the side mirrors. An imaging range d represents the imaging range of the imaging section 7916 attached to the rear bumper or the back door. For example, overlaying image data captured by the imaging sections 7910, 7912, 7914, and 7916 offers an overhead image that looks down on the vehicle 7900.

Vehicle outside information detecting sections 7920, 7922, 7924, 7926, 7928, and 7930 attached to the front, the rear, the sides, the corners, and the upper part of the windshield in the vehicle compartment of the vehicle 7900 may be, for example, ultrasonic sensors or radar devices. The vehicle outside information detecting sections 7920, 7926, and 7930 attached to the front nose, the rear bumper, the back door, and the upper part of the windshield in the vehicle compartment of the vehicle 7900 may be, for example, LIDAR devices. These vehicle outside information detecting sections 7920 to 7930 are used chiefly to detect a preceding vehicle, a pedestrian, an obstacle, or the like.

The description will continue with reference to FIG. 15 again. The vehicle outside information detecting unit 7400 causes the imaging section 7410 to capture images of the outside of the vehicle, and receives the captured image data. Further, the vehicle outside information detecting unit 7400 receives detection information from the connected vehicle outside information detecting section 7420. In a case where the vehicle outside information detecting section 7420 is an ultrasonic sensor, a radar device, or a LIDAR device, the vehicle outside information detecting unit 7400 causes ultrasound, radio waves, or the like to be transmitted, and receives the information of the received reflected waves. The vehicle outside information detecting unit 7400 may perform a process of detecting an object such as a person, a car, an obstacle, a traffic sign, or a letter on a road, or a process of detecting the distance on the basis of the received information. The vehicle outside information detecting unit 7400 may perform an environment recognition process of recognizing a rainfall, a fog, a road condition, or the like on the basis of the received information. The vehicle outside information detecting unit 7400 may compute the distance to an object outside the vehicle on the basis of the received information.

Further, the vehicle outside information detecting unit 7400 may perform an image recognition process of recognizing a person, a car, an obstacle, a traffic sign, a letter on a road, or the like, or a process of detecting the distance on the basis of the received image data. The vehicle outside information detecting unit 7400 may perform a distortion correcting process, a positioning process, or the like on the received image data, and combine image data captured by a different imaging section 7410 to generate an overhead view or a panoramic image. The vehicle outside information detecting unit 7400 may use the image data captured by the other imaging section 7410 to perform a viewpoint converting process.

The vehicle inside information detecting unit 7500 detects information on the inside of the vehicle. The vehicle inside information detecting unit 7500 is connected, for example, to a driver state detecting section 7510 that detects the state of the driver. The driver state detecting section 7510 may include a camera that images the driver, a biological sensor that detects biological information of the driver, a microphone that picks up a sound in the vehicle compartment, or the like. The biological sensor is attached, for example, to a seating face, the steering wheel, or the like, and detects biological information of the passenger sitting on the seat or the driver gripping the steering wheel. The vehicle inside information detecting unit 7500 may compute the degree of the driver's tiredness or the degree of the driver's concentration or determine whether the driver have a doze, on the basis of detection information input from the driver state detecting section 7510. The vehicle inside information detecting unit 7500 may perform a process such as a noise cancelling process on the picked-up audio signal.

The integrated control unit 7600 controls the overall operation inside the vehicle control system 7000 in accordance with a variety of programs. The integrated control unit 7600 is connected to an input section 7800. The input section 7800 is implemented as a device such as a touch panel, a button, a microphone, a switch, or a lever on which a passenger can perform an input operation. The integrated control unit 7600 may receive data obtained by recognizing the voice input through the microphone. The input section 7800 may be, for example, a remote control device that uses infrared light or other radio waves, or an external connection device such as a mobile telephone or a personal digital assistant (PDA) corresponding to the operation of the vehicle control system 7000. The input section 7800 may be, for example, a camera. In that case, a passenger can input information through gesture. Alternatively, data may be input that is obtained by detecting the movement of a wearable device worn by a passenger. Moreover, the input section 7800 may include an input control circuit or the like that generates an input signal, for example, on the basis of information input by a passenger or the like using the above-described input section 7800, and outputs the generated input signal to the integrated control unit 7600. The passenger or the like operates this input section 7800, thereby inputting various types of data to the vehicle control system 7000 or instructing the vehicle control system 7000 about a processing operation.

The storage section 7690 may include a read only memory (ROM) that stores a variety of programs to be executed by a microcomputer, and a random access memory (RAM) that stores a variety of parameters, operation results, sensor values, or the like. Further, the storage section 7690 may be implemented as a magnetic storage device such as a hard disk drive (HDD), a semiconductor storage device, an optical storage device, a magneto-optical storage device, or the like.

The general-purpose communication I/F 7620 is a general-purpose communication I/F that mediates in communication between a variety of devices in an external environment 7750. The general-purpose communication I/F 7620 may implement a cellular communication protocol such as Global System of Mobile communications (GSM), WiMAX, Long Term Evolution (LTE) or LTE-Advanced (LTE-A), or other wireless communication protocols such as a wireless LAN (which is also referred to as Wi-Fi (registered trademark)) or Bluetooth (registered trademark). The general-purpose communication I/F 7620 may be connected to a device (such as an application server or a control server) on an external network (such as the Internet, a cloud network, or a network specific to a service provider), for example, via a base station or an access point. Further, the general-purpose communication I/F 7620 may be connected to a terminal (such as a terminal of the driver, a pedestrian or a store, or a machine type communication (MTC) terminal) in the vicinity of the vehicle, for example, using the peer-to-peer (P2P) technology.

The dedicated communication I/F 7630 is a communication I/F that supports a communication protocol defined for the purpose of use for vehicles. The dedicated communication I/F 7630 may implement a standard protocol such as wireless access in vehicle environment (WAVE), which is a combination of IEEE 802.11p for the lower layer and IEEE 1609 for the upper layer, dedicated short range communications (DSRC), or a cellular communication protocol. The dedicated communication I/F 7630 typically performs V2X communication. The V2X communication is a concept including one or more of vehicle-to-vehicle communication, vehicle-to-infrastructure communication, vehicle-to-home communication, and vehicle-to-pedestrian communication.

The positioning section 7640 receives, for example, global navigation satellite system (GNSS) signals (such as global positioning system (GPS) signals from a GPS satellite) from a GNSS satellite for positioning, and generates position information including the latitude, longitude, and altitude of the vehicle. Additionally, the positioning section 7640 may also identify the present position by exchanging signals with a wireless access point, or acquire position information from a terminal such as a mobile phone, a PHS, or a smartphone that has a positioning function.

The beacon receiving section 7650 receives radio waves or electromagnetic waves, for example, from a wireless station or the like installed on the road, and acquires information such as the present position, traffic congestion, closed roads, or necessary time. Additionally, the function of the beacon receiving section 7650 may be included in the above-described dedicated communication I/F 7630.

The onboard device I/F 7660 is a communication interface that mediates in con-nections between the microcomputer 7610 and a variety of onboard devices 7760 in the vehicle. The onboard device I/F 7660 may use a wireless communication protocol such as a wireless LAN, Bluetooth (registered trademark), near field communication (NFC), or a wireless USB (WUSB) to establish a wireless connection. Further, the onboard device I/F 7660 may also establish a wired connection such as a universal serial bus (USB), a high-definition multimedia interface (HDMI), or a mobile high-definition link (MHL) via a connection terminal (not illustrated) (and a cable if necessary). The onboard devices 7760 may include, for example, at least one of a mobile device of a passenger, a wearable device of a passenger, and an information device carried into or attached to the vehicle. Further, the onboard devices 7760 may also include a navigation device that searches for routes to any destination. The onboard device I/F 7660 exchanges control signals or data signals with these onboard devices 7760.

The in-vehicle network I/F 7680 is an interface that mediates in communication between the microcomputer 7610 and the communication network 7010. The in-vehicle network I/F 7680 transmits and receives signals or the like in compliance with a predetermined protocol supported by the communication network 7010.

The microcomputer 7610 of the integrated control unit 7600 controls the vehicle control system 7000 in accordance with a variety of programs on the basis of information acquired via at least one of the general-purpose communication I/F 7620, the dedicated communication I/F 7630, the positioning section 7640, the beacon receiving section 7650, the onboard device I/F 7660, and the in-vehicle network I/F 7680. For example, the microcomputer 7610 may calculate a control target value of the driving force generating device, the steering mechanism, or the braking device on the basis of acquired information on the inside and outside of the vehicle, and output a control instruction to the drive line control unit 7100. For example, the microcomputer 7610 may perform cooperative control for the purpose of executing the functions of an advanced driver assistance system (ADAS) including vehicle collision avoidance or impact reduction, follow-up driving based on the inter-vehicle distance, constant vehicle speed driving, vehicle collision warning, vehicle lane departure warning, or the like. Further, the microcomputer 7610 may control the driving force generating device, the steering mechanism, the braking device, or the like on the basis of acquired information on the areas around the vehicle, thereby performing cooperative control for the purpose of automatic driving or the like that allows the vehicle to autonomously travel irrespective of any operation of a driver.

The microcomputer 7610 may generate three-dimensional distance information on the distance between the vehicle and an object such as a nearby structure or person on the basis of information acquired via at least one of the general-purpose communication I/F 7620, the dedicated communication I/F 7630, the positioning section 7640, the beacon receiving section 7650, the onboard device I/F 7660, and the in-vehicle network I/F 7680, and create local map information including surrounding information on the present position of the vehicle. Further, the microcomputer 7610 may predict danger such as vehicle collisions, approaching pedestrians or the like, or entry to closed roads on the basis of acquired information, and generate a warning signal. The warning signal may be, for example, a signal used to generate a warning sound or turn on the warning lamp.

The audio and image output section 7670 transmits an output signal of at least one of a sound and an image to an output device capable of visually or aurally notifying a passenger of the vehicle or the outside of the vehicle of information. In the example of FIG. 15, an audio speaker 7710, a display section 7720, and an instrument panel 7730 are exemplified as the output device. For example, the display section 7720 may include at least one of an onboard display and a head-up display. The display section 7720 may have an augmented reality (AR) display function. The output device may also be a device other than these devices like a headphone, a wearable device such as a glasses-type display worn by a passenger, a projector, or a lamp. In a case where the output device is a display device, the display device visually displays a result obtained by the microcomputer 7610 performing a variety of processes or information received from another control unit in a variety of forms such as text, images, tables, or graphs. Further, in a case where the output device is an audio output device, the audio output device converts audio signals including reproduced audio data, acoustic data, or the like into analog signals, and aurally outputs the analog signals.

Additionally, in the example illustrated in FIG. 15, at least two control units connected via the communication network 7010 may be integrated into a single control unit. Alternatively, the individual control units may be configured as control units. Moreover, the vehicle control system 7000 may also include another control unit that is not illustrated. Further, a part or the whole of the functions executed by any of the control units may be executed by another control unit in the above description. That is, as long as information is transmitted and received via the communication network 7010, predetermined operation processing may be performed by any of the control units. Similarly, a sensor or a device connected to any of the control units may be connected to another control unit, and the control units may transmit and receive detection information to and from each other via the communication network 7010.

The imaging section illustrated in FIG. 1 is applied to the imaging sections 7410, 7910, 7912, 7914, 7916, and 7918 or any of these imaging sections in the above-described vehicle control system 7000, and the polarization direction rotating section is provided to the imaging section. Further, the image signal processing section 14 and the control section 20 are provided to the integrated control unit 7600 in the application illustrated in FIG. 15. Such a configuration makes it possible to generate a polarized image and a high-resolution non-polarized image having higher resolution than the resolution of the polarized image. Accordingly, it is possible to use the acquired polarized image and high-resolution non-polarized image for driving assist, driving control, or the like.

A series of processing described herein can be executed by hardware, software, or the combination thereof. In a case of executing the processing by the software, the processing can be executed by installing the program in which the processing sequence is recorded in the memory of the computer embedded in the dedicated hardware, or can be executed by installing the program in the general-purpose computer that can execute various processing.

For example, the program can be recorded on a hard disk, a solid state drive (SSD) or read only memory (ROM) as a recording medium in advance. Alternatively, the program can be temporarily or permanently stored (recorded) in (on) a removable recording medium such as a flexible disk, a compact disc read only memory (CD-ROM), Magneto Optical (MO) disk, a digital versatile disc (DVD), a Blu-Ray Disc (registered trademark) (BD), a magnetic disk, or a semiconductor memory card. Such a removable recording medium can be provided as so-called package software.

In addition, the program can be, not only installed on a computer from a removable recording medium, but also transferred wirelessly or by wire to the computer from a download site via a network such as a LAN (Local Area Network) or the Internet. In such a computer, a program transferred in the aforementioned manner can be received and installed on a recording medium such as built-in hardware.

It should be understood by those skilled in the art that various modifications, combinations, sub-combinations and alterations may occur depending on design re-quirements and other factors insofar as they are within the scope of the appended claims or the equivalents thereof.

Additionally, the imaging device according to an embodiment of the present technology may also be configured as below.

(1)

An imaging device including:

an imaging section configured to set pixels as polarization pixels having any of polarization directions, the pixels generating pixel signals on the basis of incident light;

a polarization direction rotating section provided on an incidence plane side of the imaging section, and configured to rotate a polarization direction of the incident light; and a control section configured to control the imaging section and the polarization direction rotating section to generate a polarized image or a non-polarized image having higher resolution than resolution of the polarized image.

(2)

The imaging device according to (1), in which the control section generates the non-polarized image by rotating the polarization direction of the incident light n (where n represents a natural number) times as large as 180 degrees at constant speed during an exposure period of the imaging section.

(3)

The imaging device according to (1), in which the control section generates the non-polarized image by using images obtained by performing imaging at rotational positions in the polarization direction.

(4)

The imaging device according to (3), in which the control section performs imaging at a position at which a polarization direction of the polarization direction rotating section is equal to a polarization direction of a polarization pixel of the imaging section.

(5)

The imaging device according to (3) or (4), further including:

an image signal processing section configured to combine images for each pixel to generate the non-polarized image, the images being obtained by the imaging section performing imaging two or more times.

(6)

The imaging device according to (5), in which in a case where rotation of the polarization direction is stopped, and the imaging section performs imaging, the image signal processing section sets a signal generated by a pixel having a vertical or parallel polarization direction to an optical axis of the polarization direction rotating section as a signal indicating a polarization component of the incident light having a polarization direction that agrees with the vertical or parallel polarization direction of the pixel, and the image signal processing section sets a signal generated by a pixel having a polarization direction that is not vertical or parallel to the optical axis of the polarization direction rotating section as a signal indicating a polarization component of the incident light rotated by the polarization direction rotating section in accordance with an angular difference between the optical axis of the polarization direction rotating section and the polarization direction of the pixel.

(7)

The imaging device according to any one of (1) to (6), in which in a case where the non-polarized image is generated, the control section stops a light emitting section from emitting illumination light.

(8)

The imaging device according to any one of (1) to (7), in which the control section generates the polarized image in an imaging operation that uses a light emitting section.

(9)

The imaging device according to any one of (1) to (8), in which the polarization direction rotating section includes a half-wave plate, and a rotation driving section that rotates the half-wave plate by using an optical axial direction of the incident light as a rotation axis.

(10)

The imaging device according to any one of (1) to (9), in which the polarization direction rotating section includes a liquid crystal variable wavelength plate and a rotation driving section that drives the liquid crystal variable wavelength plate to rotate the liquid crystal variable wavelength plate by using an optical axial direction of the incident light as a rotation axis.

(11)

The imaging device according to any one of (1) to (10), in which the polarization direction rotating section is attachable and detachable.

(12)

The imaging device according to (11), in which in a case where the polarization direction rotating section is detached, and in a case where the polarization direction rotating section stops rotation of the polarization direction, the control section generates the polarized image.

(13)

The imaging device according to any one of (1) to (12), in which polarization directions of the polarization pixel have an equal angular interval.

INDUSTRIAL APPLICABILITY

According to the imaging device and the imaging method of an embodiment of the technology, it is possible to control, by a control section, an imaging section and a polarization direction rotating section positioned on an incident plane side of the imaging section, and generate a polarized image or a non-polarized image having higher resolution than resolution of the polarized image, the imaging section setting pixels as polarization pixels having any of polarization directions, the pixels generating pixel signals on the basis of incident light. It is thus possible to generate not only one of a polarized image and a non-polarized image having higher resolution than the resolution of the polarized image, but also the other of the images. Accordingly, the imaging device and the imaging method according to an embodiment of the present technology is suitable to devices each capable of performing various types of control on the basis of high-resolution non-polarized images and polarization component information.

REFERENCE SIGNS LIST 10, 10a imaging device
11 polarization direction rotating section
12 lens system block
13 imaging section
14 image signal processing section
15 display section
16 image saving section
17 user interface section
18 attachment and detachment detecting section
19 light emitting section
20 control section
111 polarizing element
111a half-wave plate
111b liquid crystal variable polarizing plate
112 rotation driving section
131 image sensor
132 polarizing filter

The invention claimed is:

1. An imaging device comprising:
an imager including a plurality of pixels arranged in an array, respective ones of the plurality of pixels including a photosensitive element and a polarization filter having a predetermined polarization angle with respect to a plane of the array, the imager configured to generate an image signal from the plurality of pixels;
a polarizing element provided on an incidence plane side of the imager; and
control circuitry configured to change a polarization direction of incident light by causing the polarizing element to rotate with respect to the imager, wherein
the control circuitry is configured to switch between a polarized image having a first resolution and a non-polarized image having a second resolution higher than the first resolution, and
the control circuitry is configured to generate the non-polarized image by rotating the polarization direction of the incident light n (where n represents a natural number) times as large as 180 degrees during an exposure period of the imager.

2. The imaging device according to claim 1, wherein
the control circuitry is configured to generate the non-polarized image by using images obtained by performing imaging at rotational positions in the polarization direction.

3. The imaging device according to claim 2, wherein
the control circuitry is configured to perform imaging at a position at which a polarization direction of the polarizing element is equal to a polarization direction of a respective one of the plurality of pixels.

4. The imaging device according to claim 2, further comprising:
image signal processing circuitry configured to combine images for each of the plurality of pixels to generate the non-polarized image, the images being obtained by the imager performing imaging two or more times.

5. The imaging device according to claim 4, wherein
in a case where rotation of the polarization direction of the polarizing element is stopped, and the imaging section performs imaging, the image signal processing circuitry:
sets a first signal generated by a first pixel of the plurality of pixels having a first polarization direction that is vertical or parallel to an optical axis of the polarizing element as indicating a first polarization component of the incident light having a polarization direction that agrees with the first polarization direction, and
sets a second signal generated by a second pixel of the plurality of pixels having a second polarization direction that is not vertical or parallel to the optical axis of the polarizing element as indicating a second polarization component of the incident light rotated by the polarizing element in accordance with an angular difference between the optical axis of the polarizing element and the second polarization direction.

6. The imaging device according to claim 1, wherein
in a case where the non-polarized image is generated, the control is configured to stop a light emitting section from emitting illumination light.

7. The imaging device according to claim 1, wherein
the control circuitry is configured to generate the polarized image in an imaging operation that uses a light emitting section.

8. The imaging device according to claim 1, wherein
the polarizing element includes a half-wave plate, and a rotation driving section that rotates the half-wave plate by using an optical axial direction of the incident light as a rotation axis.

9. The imaging device according to claim 1, wherein
the polarizing element includes a liquid crystal element with a rotating polarization direction.

10. The imaging device according to claim 1, wherein
the polarizing element is attachable and detachable.

11. The imaging device according to claim 10, wherein
in a case where the polarizing element is detached, and in a case where the polarizing element stops rotation of the polarization direction, the control circuitry generates the polarized image.

12. The imaging device according to claim 1, wherein
respective polarization directions of the corresponding ones of the plurality of pixels have an equal angular interval.

13. The imaging device according to claim 1, further comprising:
a color filter including a plurality of color component units, respective ones of the plurality of color component units corresponding to one of a plurality of colors, wherein the plurality of color component units are arranged in a predetermined color pattern.

14. A vehicle comprising the imaging device according to claim 1.

15. An imaging method comprising:

controlling, by control circuitry, an imager and a polarizing element positioned on an incidence plane side of the imager, the imager including a plurality pixels arranged in an array, respective ones of the plurality of pixels including a photosensitive element and a polarization filter having a predetermined polarization angle with respect to a plane of the array, the imager configured to generate an image signal from the plurality of pixels;

switching the control circuitry between a polarized image having a first resolution and a non-polarized image having a second resolution higher than the first resolution; and generating, by the control circuitry, the non-polarized image by rotating the polarization direction of the incident light n (where n represents a natural number) times as large as 180 degrees during an exposure period of the imager.

16. A computing device, comprising:

a processor;

a memory; and an imaging device, the imaging device including:

an imager including a plurality of pixels arranged in an array, respective ones of the plurality of pixels including a photosensitive element and a polarization filter having a predetermined polarization angle with respect to a plane of the array, the imager configured to generate an image signal from the plurality of pixels;

a polarizing element provided on an incidence plane side of the imager; and control circuitry configured to change a polarization direction of incident light by causing the polarizing element to rotate with respect to the imager, wherein the control circuitry is configured to switch between a polarized image having a first resolution and a non-polarized image having a second resolution higher than the first resolution, and the control circuitry is configured to generate the non-polarized image by rotating the polarization direction of the incident light n (where n represents a natural number) times as large as 180 degrees during an exposure period of the imager.

17. A vehicle comprising the computing device according to claim 16.

* * * * *